(12) United States Patent
Beresnev et al.

(10) Patent No.: US 10,371,906 B1
(45) Date of Patent: Aug. 6, 2019

(54) METHOD AND APPARATUS FOR DELIVERING THE FIBER LASER RADIATION INTO DYNAMICAL WAVEGUIDE

(71) Applicant: U.S. Army Research Laboratory, Adelphi, MD (US)

(72) Inventors: Leonid A. Beresnev, Columbia, MD (US); Anthony R. Valenzuela, Baltimore, MD (US); Chatt C. Williamson, Mt. Airy, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/873,143

(22) Filed: Jan. 17, 2018

(51) Int. Cl.
| | |
|---|---|
| G02B 6/26 | (2006.01) |
| G02B 6/32 | (2006.01) |
| G02B 6/42 | (2006.01) |
| G02B 7/02 | (2006.01) |
| H01S 3/00 | (2006.01) |
| H01S 3/11 | (2006.01) |
| H05H 1/46 | (2006.01) |
| G02B 27/40 | (2006.01) |
| H01S 3/067 | (2006.01) |

(52) U.S. Cl.
CPC ............ *G02B 6/4225* (2013.01); *G02B 6/262* (2013.01); *G02B 6/32* (2013.01); *G02B 6/4227* (2013.01); *G02B 6/4296* (2013.01); *G02B 7/02* (2013.01); *G02B 27/40* (2013.01); *H01S 3/005* (2013.01); *H01S 3/06708* (2013.01); *H01S 3/11* (2013.01); *H05H 1/46* (2013.01)

(58) Field of Classification Search
None
See application file for complete search history.

(56) References Cited

U.S. PATENT DOCUMENTS

| | | | | |
|---|---|---|---|---|
| 2014/0241655 A1* | 8/2014 | Buchanan | ............... | B61F 15/22 384/459 |
| 2014/0241665 A1* | 8/2014 | Beresnev | ................. | G02B 6/32 385/33 |

\* cited by examiner

*Primary Examiner* — Tina M Wong
(74) *Attorney, Agent, or Firm* — Alan I. Kalb

(57) ABSTRACT

A technique for delivery of a divergent laser beam emitted with a free-space laser fiber facet, the beam having an optical power, into an optical waveguide. An optical axis of the laser beam is aligned approximately along a propagation Z direction into the optical waveguide. The fiber facet is located in a first plane perpendicular to the Z direction. The waveguide includes an input, direction, and X-Y position of the input in a second plane. The waveguide includes fluctuations in a X-Y-Z position of the input and fluctuations in direction. The laser beam is transformed into a collimated beam by re-directing a propagation of the laser beam, shifting the laser beam parallel to the Z direction, and focusing the laser beam into the input. The speed of transformation of the laser beam is greater than an instant speed of the fluctuations. A maximum optical power is delivered into the waveguide.

16 Claims, 27 Drawing Sheets

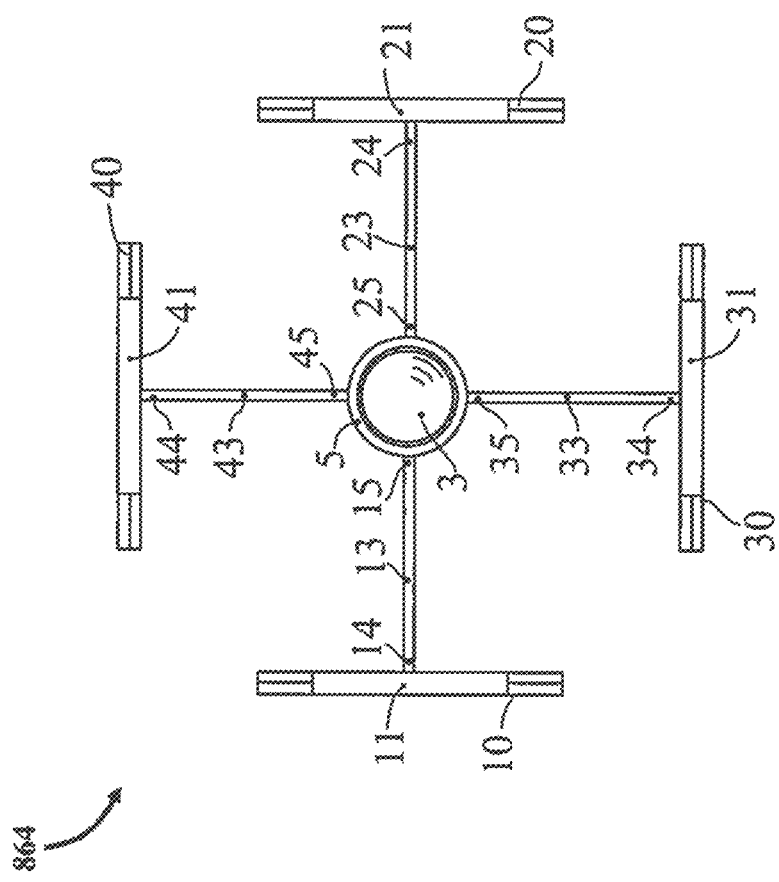

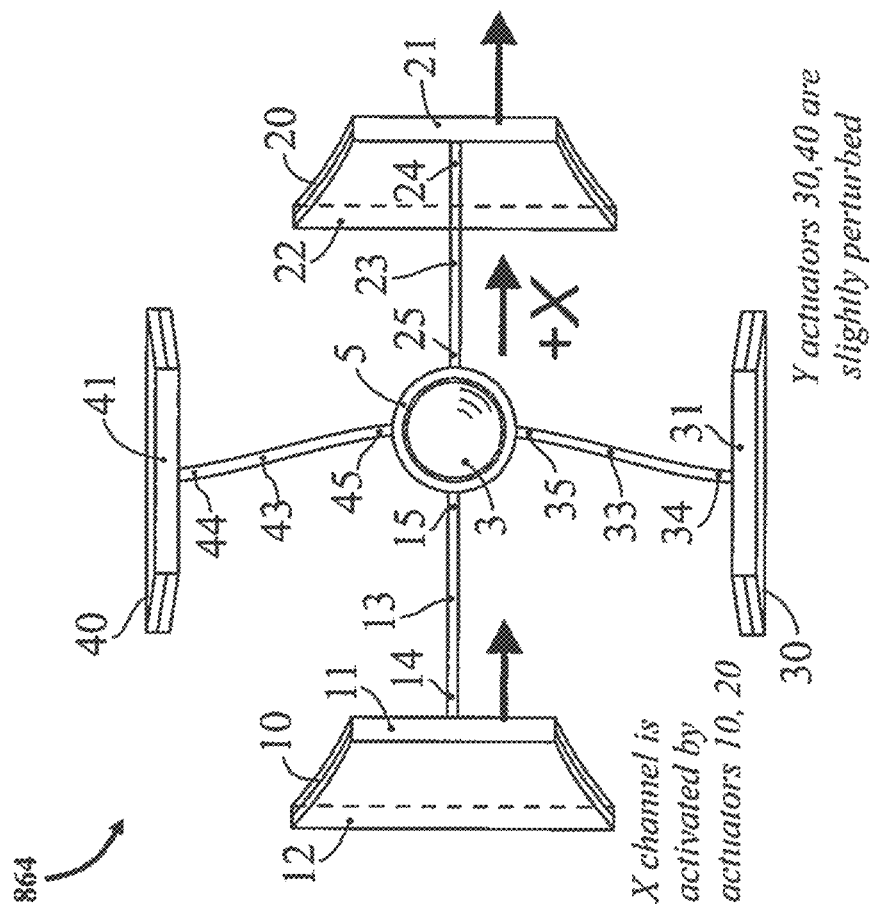

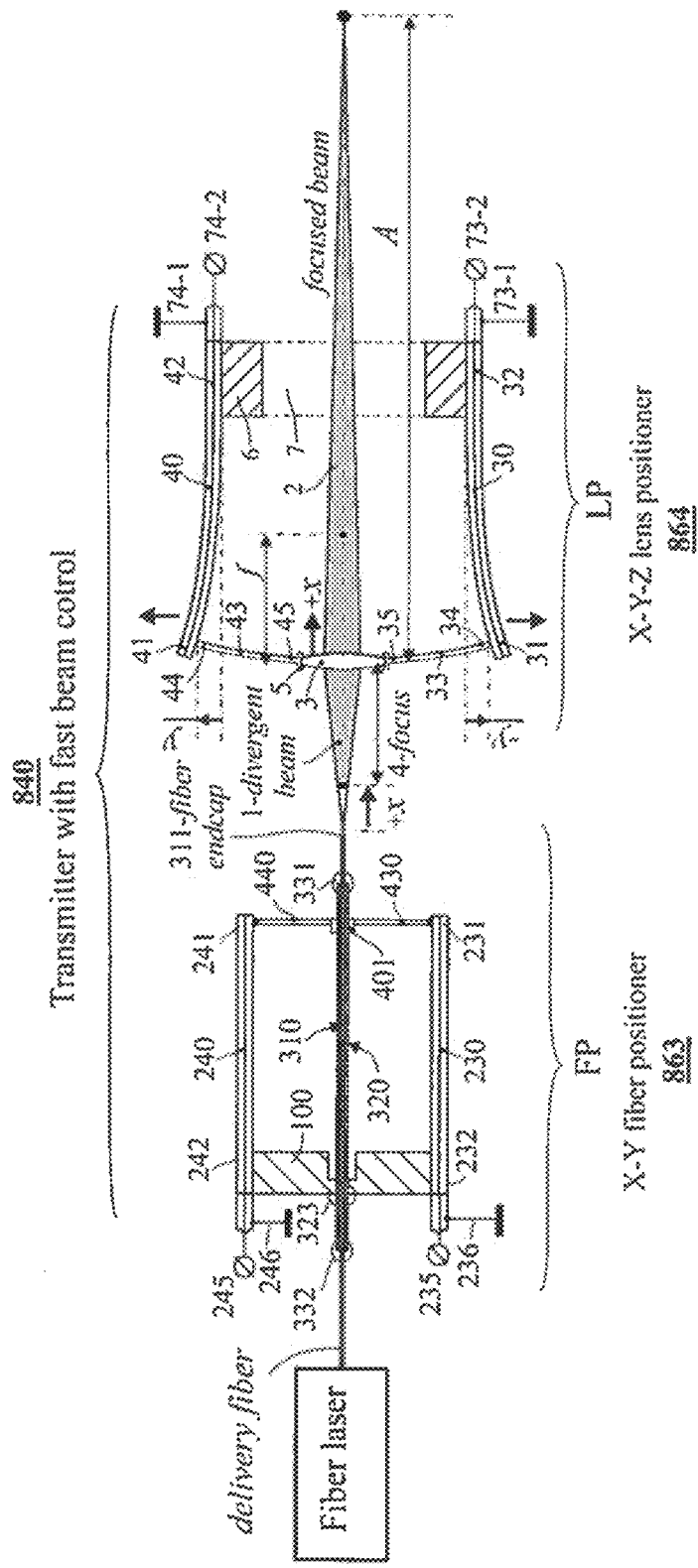

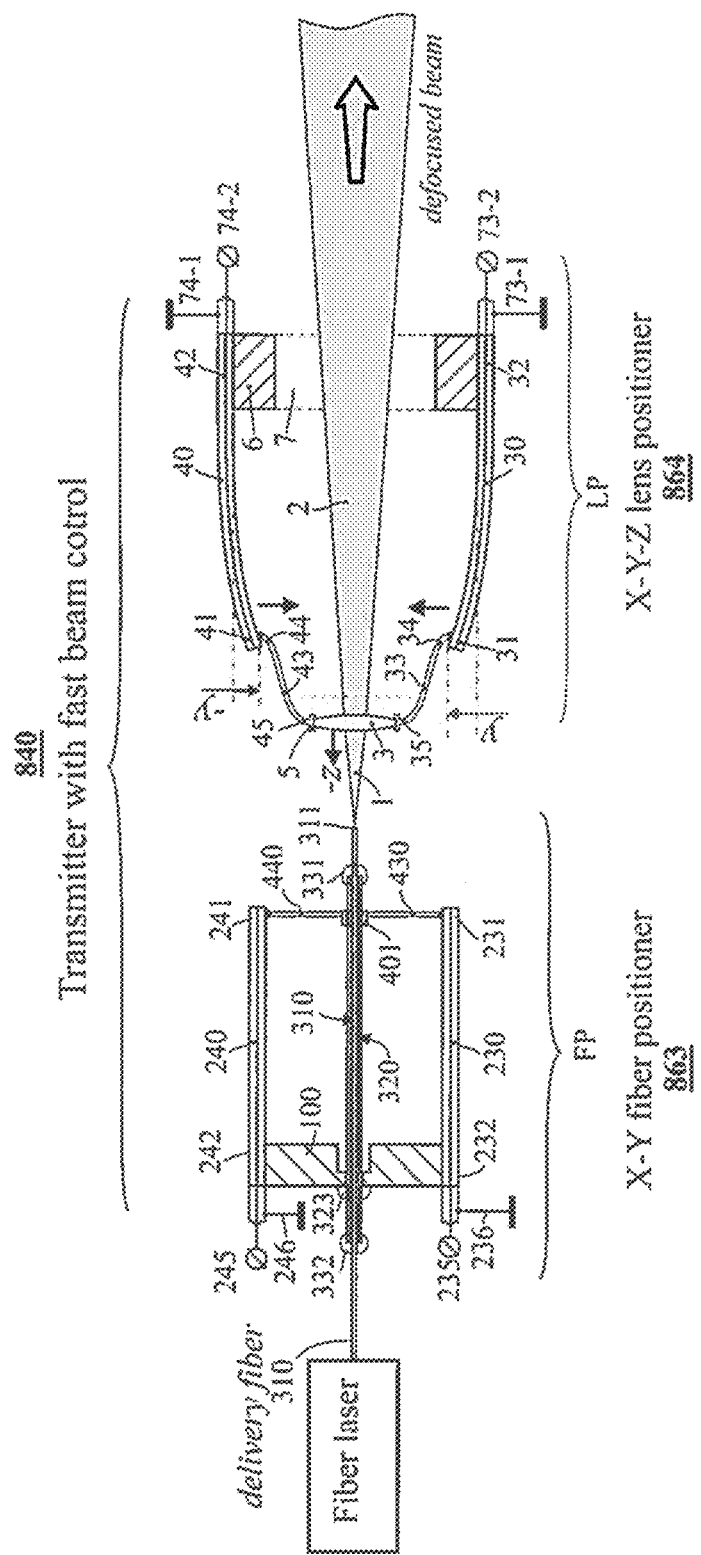

950

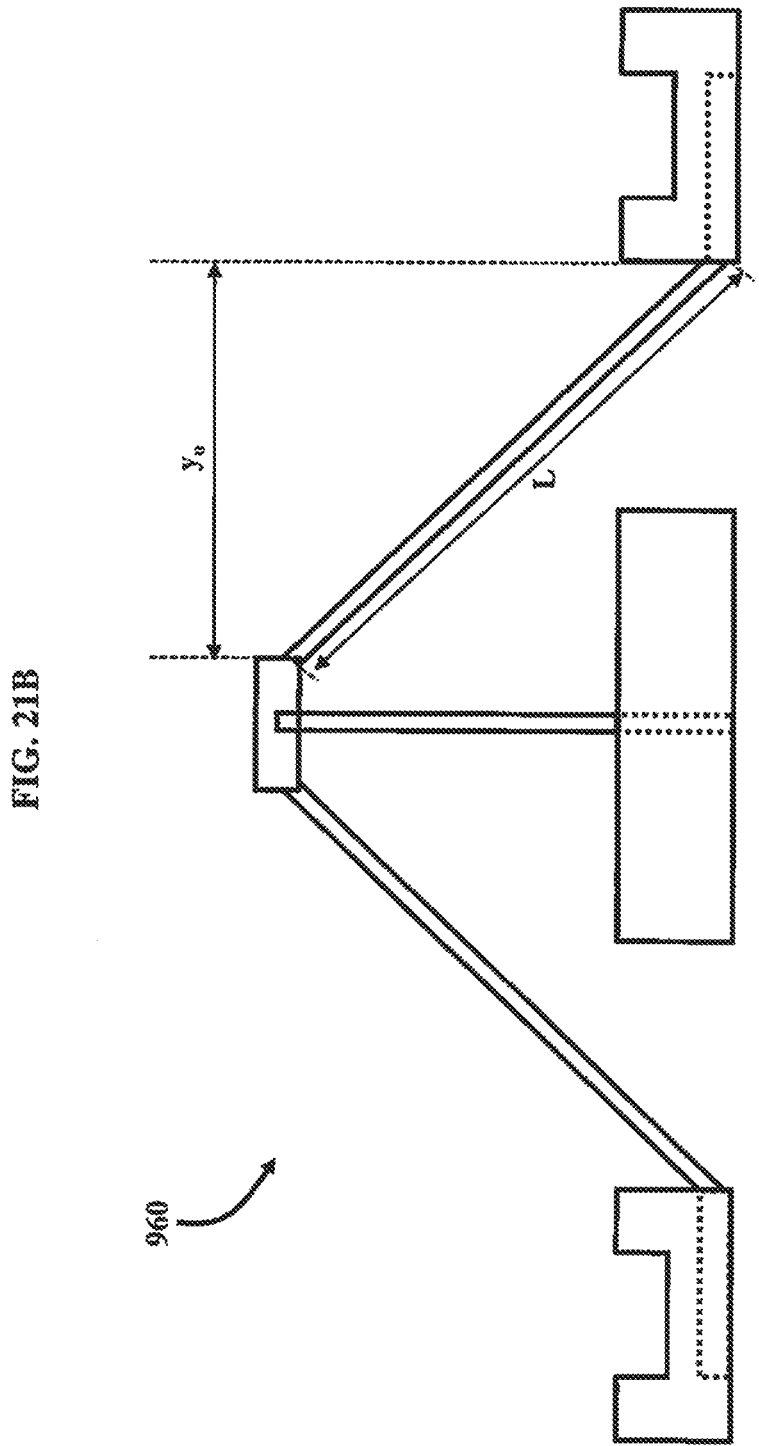

METHOD AND APPARATUS FOR DELIVERING THE FIBER LASER RADIATION INTO DYNAMICAL WAVEGUIDE

GOVERNMENT INTEREST

The embodiments described herein may be manufactured, used, and/or licensed by or for the United States Government without the payment of royalties thereon.

BACKGROUND

Technical Field

The embodiments herein generally relate to laser beam propagation, and more particularly to techniques to improve the delivery of fiber optic laser power in optical systems.

Description of the Related Art

Some U.S. military applications for continuous wave (CW), High Energy Lasers (HELs) require long standoffs and delivering energies greater than 1 kilojoule per second to target into a small spot (less than 1 $cm^2$) to deliver damaging power density greater than 1 $kW/cm^2$. Relatively small power/energy laser radiation delivering 1-10 kJ/sec to the target may be useful in tactical applications with distances of 0.5-2 km. The damaging irradiance >1 $kW/cm^2$ may be transmitted using the focusing mirror or lens with a diameter of 10 cm (distance 1 km, diffraction limited spot ~2 cm, wavelength ~1 µm, power ~2 kW) provided that the emitted beam has an ideal beam quality($M^2$~1.1), and there is no mitigation of the beam quality during atmospheric propagation.

Given the limitation of linearly travelling through atmosphere that is often turbulent and filled with obscurants, large and complex beam directors are needed with adaptive optics (wavefront sensors, deformable mirrors, etc.) to compensate for dynamic beam distortions. The increase of size of focusing mirrors and lenses increases drastically the size, weight, and power (SWaP) of a HEL system.

The phased array of laser beams emitted from a conformal aperture may partially solve the anisoplanatic contribution from a sparse array with numerous sub-apertures, but with extra efforts required for the feedback control of the phase and direction of numerous beams. With desired power of 100 kW or more, many tens of beams should be controlled by hundreds of control channels, requiring very wide frequency bandwidth in the feedback system.

A conventional "non-classic" approach to deliver the high power and energy of a CW laser beam into a small spot on target uses a wave-guiding optical channel created with an ultra-short pulse lasers USPL (picosecond or shorter) with extremely high peak power (greater than 10 GW). The formation of this waveguide is directly related to the filamentation process achieved with USPL.

Filamentation requires an intense laser pulse (typically greater than 10 GW peak power in air) traveling through a transparent medium with a nonlinear index of refraction that, at these intensities, is non-negligible. This change to the index of refraction leads to a positive lensing effect known as self-focusing that becomes stronger as the pulse propagates, as shown in FIG. 1, which depicts a filamentation process resulting from self-focusing leading to plasma defocusing.

Eventually, the intensity of the pulse becomes strong enough to ionize the propagation media, freeing electrons and generating a plasma. Plasma then acts as a negative lens, defocusing the core of the laser pulse. If the self-focusing can be balanced by the defocusing and loss of power due to ionization, a quasi-stable structure—a filament—may be created over an extended region up to hundreds of meters. The filament includes a compressed laser pulse with an energy reservoir surrounding it trailed by a plasma column. While the laser pulse and energy reservoir exist for a time period on the order of the original laser pulse (less than a picosecond), the plasma lasts for a few nanoseconds before dissipating, whereas the thermal gradient air channel may last up to one millisecond after plasma dissipation.

SUMMARY

In view of the foregoing, an embodiment herein provides a method of delivery of a divergent laser beam emitted with a free-space laser fiber facet, the beam having an optical power, into an optical waveguide, the method comprising aligning an optical axis of the laser beam approximately along a propagation Z direction into the optical waveguide, wherein the fiber facet is located in a first plane perpendicular to the Z direction, wherein the waveguide comprises an input, direction, and a X-Y position of the input in a second plane, and wherein the waveguide comprises fluctuations in a X-Y-Z position of the input and fluctuations in direction; and transforming the laser beam into a collimated beam by re-directing a propagation of the laser beam, shifting the laser beam parallel to the Z direction, and focusing the laser beam into the input, wherein a speed of transformation of the laser beam is greater than an instant speed of the fluctuations, wherein a maximum optical power is delivered into the waveguide. The optical waveguide may comprise an air channel having a larger refractive index along a central axis than in periphery areas of the air channel. The periphery areas may comprise three or more substantially circularly arranged sub-channels comprising an average steady-state temperature higher than areas near the central axis of the air channel. The sub-channels may be formed with a filamentation process through a sequence of energy dissipation by delivering energy with ultra-short high-power laser pulses with a repetition rate of 1 kHz or more, and wherein the method may comprise providing the a higher steady-state temperature in the sub-channels relative to a temperate in the central axis of the air channel.

Another embodiment provides an apparatus for delivery of a divergent laser beam emitted with a free-space laser fiber facet into a waveguide with a fluctuating position of input, the apparatus comprising a fiber positioner comprising a wide frequency bandwidth of first X-Y displacements of the fiber facet in a first plane, wherein the first X-Y displacements comprise a first motion; a micro-lens sampling and transforming the laser beam into a collimated beam, wherein the micro-lens comprises a focus length of f, wherein the micro-lens is located in a third plane perpendicular to a propagation direction along a Z axis, wherein the third plane is located in between the first plane and a second plane approximately at a distance f from the fiber facet, wherein the micro-lens comprises an optical axis approximately coinciding with an axis of the laser beam, wherein the micro-lens is configured to be moved with a wide frequency bandwidth of second X-Y displacements in the third plane, and of a Z—displacement along the Z axis, wherein the second X-Y displacements comprise a second motion, and wherein a displacement along the Z axis comprises a third motion; a plurality of bending actuators to create the first, second, and third motions; an optical waveguide approximately along the Z axis; a plurality of optical elements to intercept a fraction of intensity of a delivered laser beam into the waveguide or the fraction of intensity escaped from the waveguide; an opto-electronic mechanism to convert the intensity to an electronic signal, proportional to a power of the delivered beam focused into the optical waveguide or escaped from the waveguide; and a feedback processor to provide the electronic signal to the plurality of bending actuators to maximize a focusing of a power of the laser beam into the optical waveguide or to minimize a power of an escaped beam fraction leaving the optical waveguide.

The optical waveguide may comprise an air channel having a larger refractive index along a central axis than in periphery areas of the air channel. The periphery areas may comprise three or more substantially circularly arranged sub-channels comprising an average steady-state temperature higher than areas near the central axis of the air channel. The sub-channels may be formed with a filamentation process through a sequence of energy dissipation by delivering energy with ultra-short high-power laser pulses with a repetition rate of 1 kHz or more, and wherein a higher steady-state temperature exists in the sub-channels relative to a temperate in the central axis of the air channel. The apparatus may comprise a X-Y-Z lens positioner to provide the second and third motions of the micro-lens. The lens positioner may comprise a plurality of bending actuators; a base comprising a plurality of side surfaces attached to the plurality of bending actuators; and a prism comprising a distal surface, a proximal surface, and a plurality of side surfaces, wherein the proximal surface is attached to the base, and wherein the distal surface accommodates a X-Y-Z micro-lens converter and viscous-elastic material damping the converter. The plurality of bending actuators may comprise a plurality of distal ends and proximal ends, wherein the plurality of proximal ends is attached to the plurality of side surfaces of the base, and side surfaces of the prism form a profiled gap with the plurality of bending actuators.

The micro-lens X-Y-Z converter may be aligned with the base, wherein the X-Y-Z converter comprises a collar comprising the micro-lens and a plurality of flexible beams, and wherein the plurality of flexible beams comprises a plurality of inward ends attached to the collar, and a plurality of outward ends attached to a plurality of distal ends of the bending actuators wherein the plurality of flexible beams comprises inflexions in planes along the Z axis. The apparatus may comprise viscous-elastic damping material to provide a suppression of resonance vibrations of the bending actuators and of the plurality of flexible beams of the X-Y-Z converter. The plurality of bending actuators may be configured to provide the second and third motions of the micro-lens using combinations of electrical voltages applied to selected ones of the plurality of bending actuators. The second motion of the micro-lens may occur in a X direction by applying electrical voltages to a first pair of opposite bending actuators, wherein the second motion of the micro-lens occurs in a Y direction by applying electrical voltages to a second pair of opposite bending actuators, and wherein the third motion of the micro-lens occurs in a Z direction by applying electrical voltages to all of the plurality of bending actuators. The base and the prism may comprise a bore for transmitting the collimated beam coming through the micro-lens. The distal ends of the plurality of bending actuators along with the micro-lens X-Y-Z converter may be directed to the fiber facet. The apparatus may comprise a transmitter for the collimated beam emitted from the fiber facet, wherein the transmitter is configured for focusing into the optical waveguide. The apparatus may comprise an assembly containing a coaxial arrangement of the fiber positioner and the lens positioner in holding tubes. The holding tubes may comprise flexible areas and a controlling mechanism and provide mutual alignment of the fiber facet and micro-lens with six decoupled degrees of freedom, and wherein the controlling mechanism comprise screws and screw-eccentric assemblies.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 12A illustrates a top view of a lens positioner in an initial stage;

FIG. 12B illustrates a top view of a lens positioner when the actuators are bending to the right;

FIG. 13 illustrates an apparatus for focusing a beam by displacement of a micro-lens to the right in a lens positioner;

FIG. 14 illustrates an apparatus for de-focusing a beam by displacement of a micro-lens to the left in a lens positioner;

FIG. 21B illustrates a X-Y-Z distributor for a 3D lens positioner;

DETAILED DESCRIPTION

Figure 1:
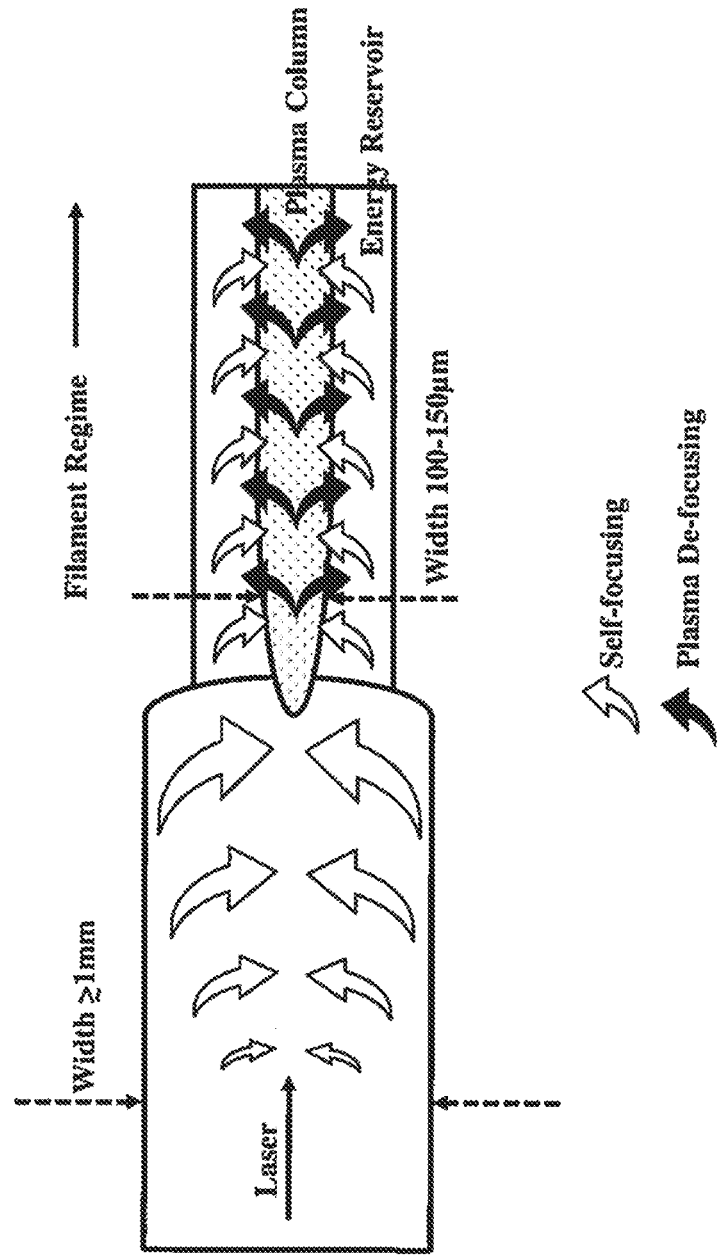
FIG. 1 illustrates a filamentation process resulting from self-focusing leading to plasma defocusing.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Filaments have been shown to nonlinearly travel through turbulence and obscurants with lower losses than CW lasers. By using filaments to inscribe a preferred waveguide, it is possible to transmit a CW beam with lower losses, thereby delivering more effectively the energy necessary to affect the target. Due to the intrinsically fluctuating nature of the filamentation process, the parameters of thermal filamentation waveguide will also be fluctuating. Especially unstable is the location of waveguide "input" aperture, the place where self-focusing and formation of plasma begins. Additionally, atmosphere conditions will significantly impact the waveguide parameters due to turbulence, aerosols, humidity variations, etc. The high-energy CW beam can be strongly attenuated or/and leak from such quickly "deformable" waveguide due to these distortions.

The expected diameter of the cold air waveguide is of the order of 1 mm or less and location of the input aperture can be expected to fluctuate in the radial direction fractions of mm and in the propagation direction tens of mm or more. The numerical aperture of the cold-air waveguide is estimated to be as small as $(3-6) \times 10^{-3}$ which may require much smaller angle of convergence of the CW beam, hence much longer focal length of lens collimating the high-energy beam. To match the CW beam with the cold-air waveguide, the beam should be capable of fast shifts in parallel direction, changes of direction and fast re-focusing with rates in excess of 1 kHz. Thus, it is a significant challenge to hold the CW beam precisely co-aligned with fluctuating cold-air waveguide (or with fast vibrating input of another fiber).

Fiber lasers are considered the most advanced light source for numerous applications from fiber optic telecommunications and medicine to machining industry owing to very high efficiency of electrical-to-optical conversion, and perfect beam quality ($M^2<1.1$), allowing one to focus almost full power into diffraction limited spot. The focusing of the laser radiation from free-space fiber facet onto a destination point is among the most common task in any fiber laser applications.

The embodiments herein provide an apparatus and method for precise focusing of a laser beam emitted with a fiber facet into a dynamical waveguide with unstable position of waveguide input. As inputs, the following options are considered: (a) input of another fiber in free-space coupling between fibers, (b) thermal filamentation waveguide: "cold air" channel surrounded by "hot air" channels, hot channels being formed with a filamentation process induced with ultra-short laser pulses, through the sequence of "self-focusing—plasma—heating" events with a high repeat rate, and (c) in general, any small size movable target capable to provide the metric for feedback (e.g., pinhole in spatial filtering system with photosensor behind of pinhole, etc.).

The method is based on fast control of five parameters of a divergent beam (e.g., Gaussian) emitted into free-space from a fiber laser. These parameters are: (1) focus-de-focus, (2) elevation, (3) azimuth, (4) X-shift, and (5) Y-shift.

The control feedback circuitry includes the photo-sensor placed (a) behind the target aperture, or by a beam splitter near the target aperture, or (b) in telescope receiving the photons reflected from the target, where the signal from sensor does optimize the above-mentioned five parameters (typically maximizing the signal from sensor). The version of feedback with minimization of the sensor may be used as well, if the sensor or array of sensors can detect the radiation leakage. The standard algorithms for this optimization are considered; e.g., stochastic parallel gradient descent (SPGD), or other "hill climbing" algorithms.

The apparatus includes two co-aligned devices: fiber optic positioner (FP) with a high frequency bandwidth with two degrees of freedom of fast control of X-Y position of fiber facet, and lens positioner (LP) with three degrees of freedom for fast displacements of the micro-lens in X-Y-Z directions. The bending actuators are used in both devices. Bimorph actuators based on electro-strictive material (e.g. piezoelectric) may also be used.

In the LP device, the 3-dimensional converter transforms the bending of three or four bending actuators into X, Y and Z displacements of the micro-lens, embedded into a collar, located in the center of the mentioned converter. Flexible S-shaped beams connect the collar with distal ends of bending actuators, whereas proximal ends of actuators are attached to the solid base.

The method and apparatus allow one to have permanent coupling of a beam emitted by the delivery fiber with a fast fluctuating small size destination target; e.g., intrinsically unstable thermal "filamentation" waveguide, owing to a high speed of all control degrees of freedom with a typical frequency bandwidth of many kHz. Referring now to the drawings, and more particularly to FIGS. 2 through 24, where similar reference characters denote corresponding features consistently throughout the figures, there are shown exemplary embodiments.

Figure 2:
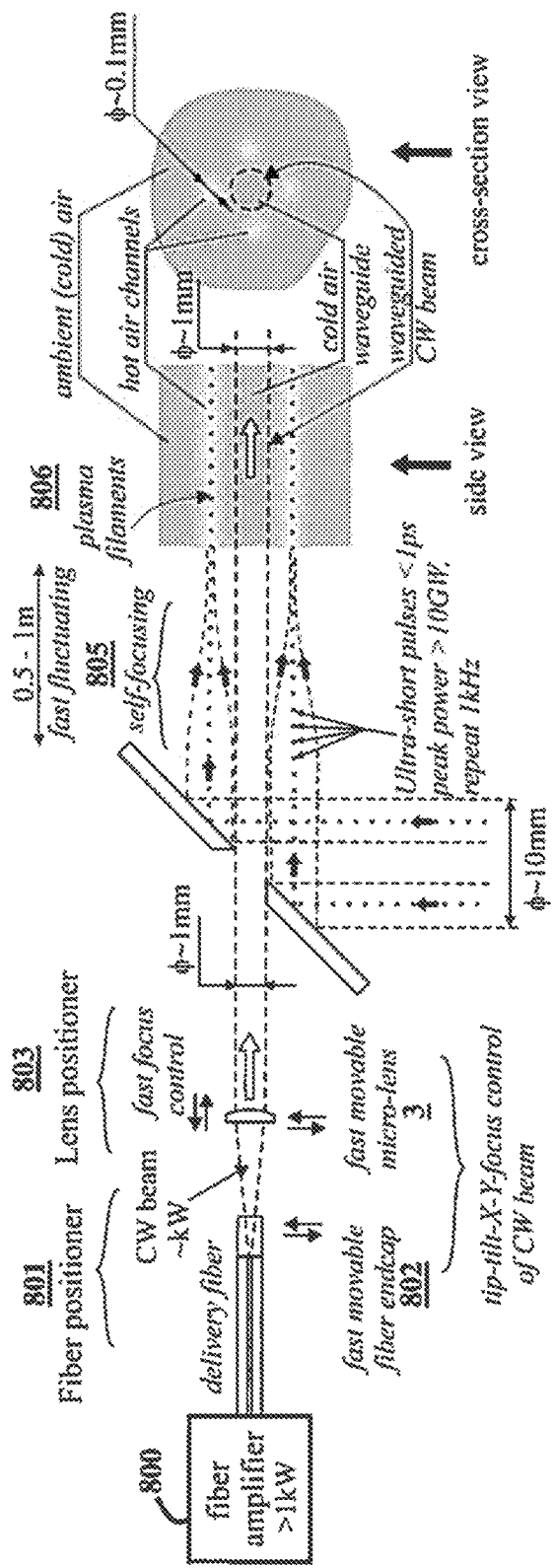
FIG. 2 illustrates an apparatus for co-aligning a CW high energy beam with a fluctuating waveguide.

The embodiments herein provide a method for the fast control of five parameters of a very narrow laser beam and an apparatus for implementing the method. In FIG. 2 the general schematic of co-aligning the CW high energy beam with fluctuating waveguide such as induced with USLP thermal filamentation is provided. Here, a fiber amplifier (>1 kW) 800 provides high power radiation into the delivery fiber. A fiber positioner 801 comprises the delivery fiber and a fast movable fiber endcap 802. A CW beam (~kW) is emitted from the endcap 802 into the lens positioner 803, which comprises a fast movable micro-lens 3, which provides for fast focus control of the CW beam. The endcap 802 and micro-lens 3 constitute the tip-tilt-X-Y-focus control of the CW beam. The CW beam continues (propagates) to the area of a self-focusing process 805 with the following example parameters: ultra-short pulses <1 ps, peak power >10 GW, and repeat 1 kHz. Next, the CW beam continues (propagates) through plasma filaments area 806 comprising of an ambient (cold) air inner channel surrounded with outer hot air channels.

Figure 3:
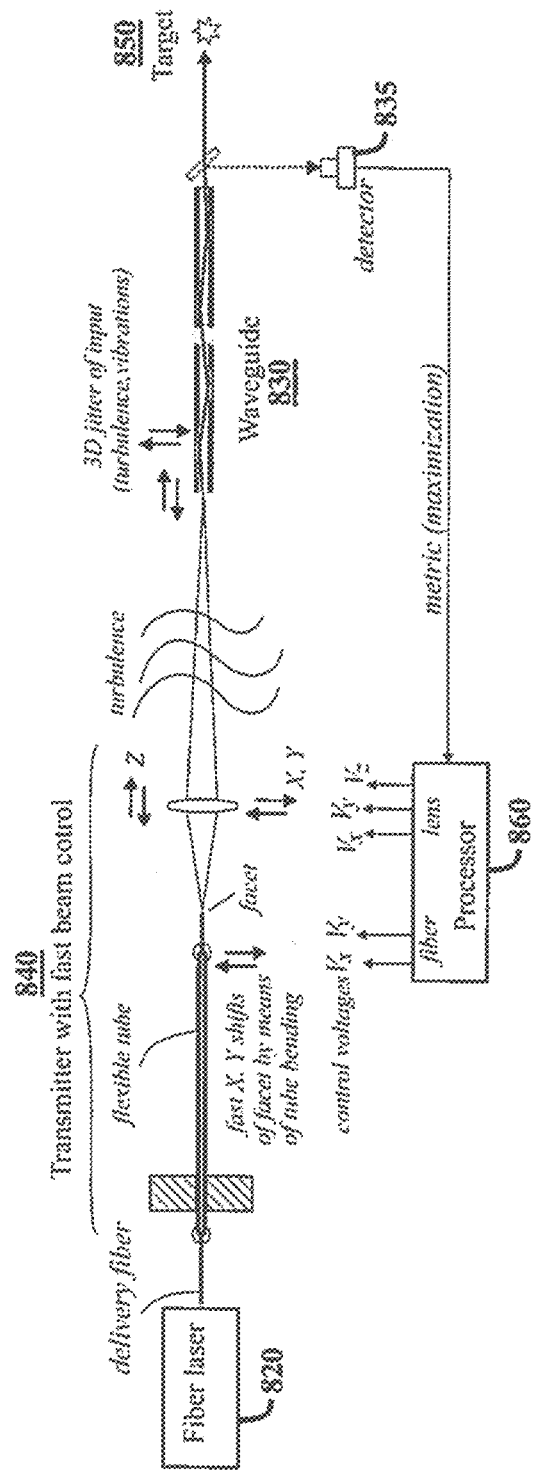
FIG. 3 illustrates an apparatus for focusing a collimated laser beam into a fast movable waveguide with short targeting distances, and a beam splitter for providing feedback.
Figure 4:
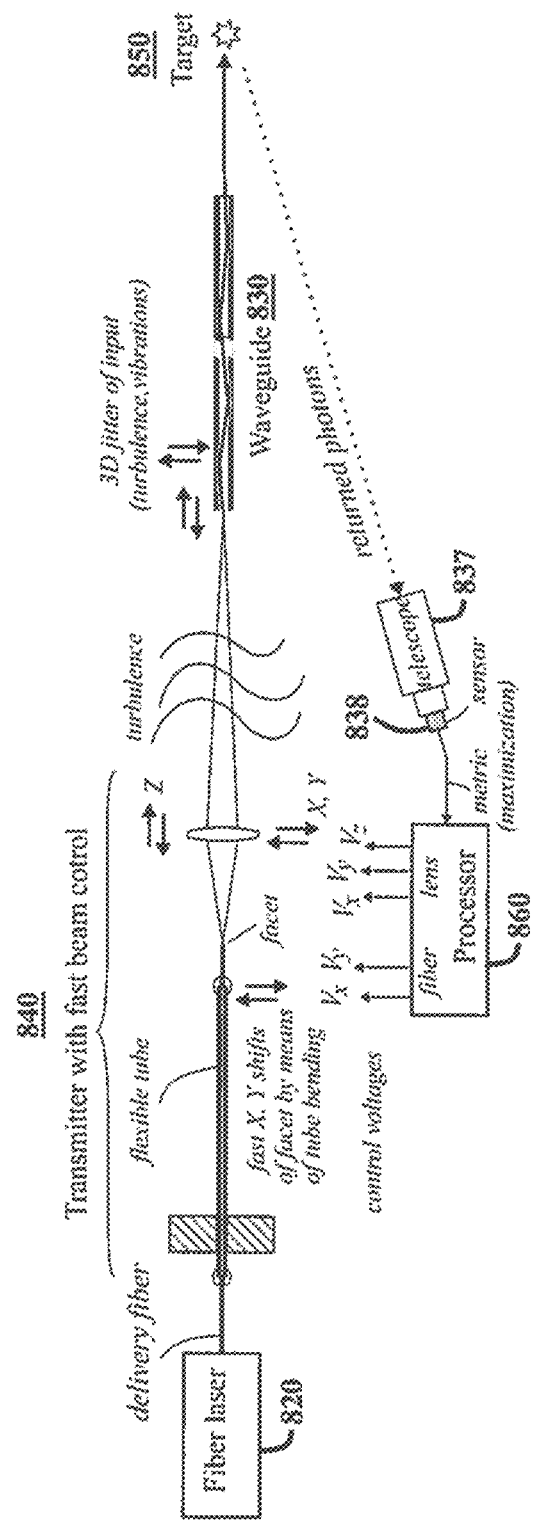
FIG. 4 illustrates an apparatus for focusing a collimated laser beam into a fast movable waveguide with long targeting distances, and a target returning photons for providing feedback.
Figure 5:
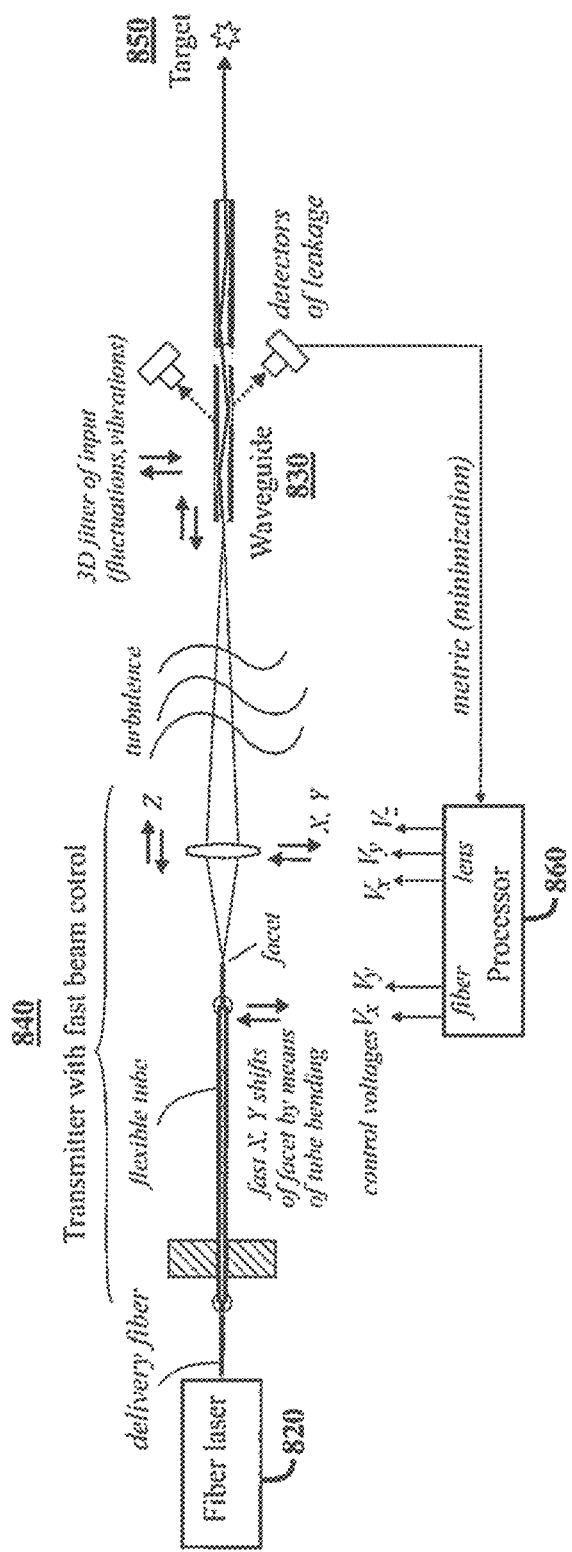
FIG. 5 illustrates an apparatus for focusing a collimated laser beam into a fast movable waveguide with short targeting distances, with leaked radiation minimization.

In FIGS. 3 through 5, with reference to FIG. 2, examples of the control circuitry are shown allowing one to maximize the coupling of the laser radiation with the waveguide (begin of air filamentation by USLP, or fiber optic input) or receiver aperture (pinhole or processing point on manufactured part) in conditions of vibrations of transmitter 840 and fluctuations in position of input of waveguide 830. The detector 835 provides the electric signal proportional to the optical power transmitted through the fluctuating waveguide 830. This signal is an input metric for feedback circuitry where processor 860 provides the stochastic parallel gradient descent (SPGD) electrical pulses with voltages, $V_x$, ... $V_z$ to piezoelectric actuators of transmitter 840 to maximize the signal from detector. At the maximum signal from the detector 835, the maximum optical power is focused into the input of the waveguide 830. The telescope 837 is configured to capture the optical photons returned with the target 850 and the sensor 838 provides the ultimate electrical signal proportional to intensity of spot on a target 850. This signal is an input for feedback circuitry where processor 860 provides the SPGD electrical pulses (perturbations) with voltages $V_x$, ... $V_z$ to piezoelectric actuators of transmitter 840 to maximize the signal from the sensor 838. At a maximum signal from the sensor 838, the maximum optical power is focused into a spot on the target 850 creating the maximum intensity of the returned photons. Namely, the creation of the maximum intensity on the target 850 delivered through the waveguide 830 with a very small diameter is the goal of the feedback circuitry.

Figure 6:
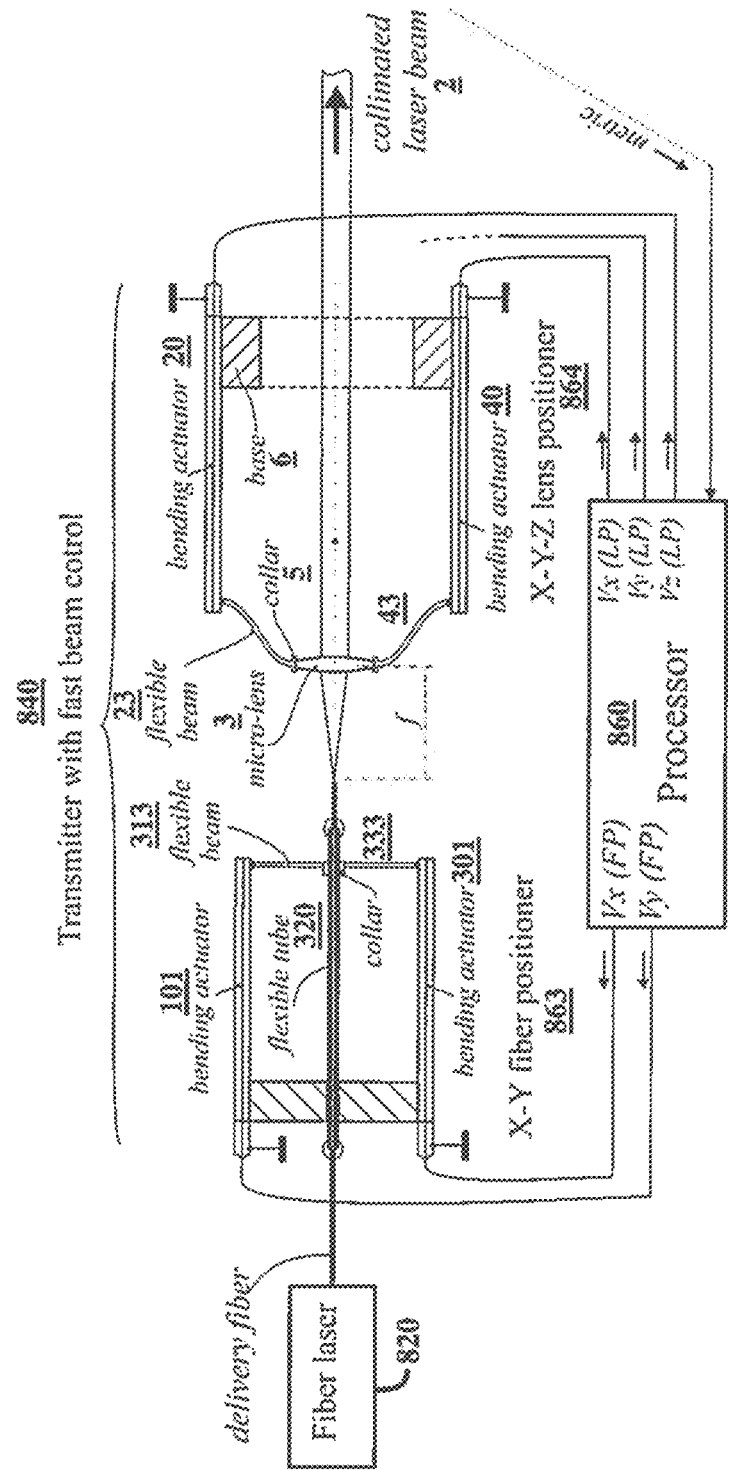
FIG. 6 illustrates an apparatus for fast control of five parameters of a laser beam with control circuitry shown.

FIG. 6, with reference to FIGS. 2 through 5, illustrates the transmitter 840 of an ultra-narrow CW beam with five degrees of fast control of the beam. The transmitter 840 with fast beam control provides fast changes of five parameters of the CW beam emitted with the fiber laser 820. The transmitter 840 comprises two co-aligned devices: fiber positioner (FP) 863 and lens positioner (LP) 864. In the apparatus, the bending actuators 101, 301 are controlling the position of emitting fiber tip (in FP device 863) in the Y direction (plane of the paper), and the bending actuators 20, 40 are controlling the positions of micro-lens (in LP device) in the Y and Z direction (in the plane of the paper). The similar bending actuators 201, 401 (not shown) in FP device 863 and the bending actuators 10, 30 (not shown) in the lens positioner 864 are controlling the X positions of the fiber tip and micro-lens 3, respectively. The processor 860 supplies the control voltages $V_x$, $V_y$, for the X-Y fiber positioner 863 and $V_x$, $V_y$, $V_z$ for the X-Y-Z lens positioner 864 that provides the maximum coupling of collimated (convergent) laser beam with the waveguide 830, shown in FIGS. 2 through 5 by means of fast optimization of positions of the emitting fiber tip (endcap 802) and micro-lens 3. The endcap 802 may be configured as a coreless piece of fiber spliced to the emitting fiber tip in conventional high-power (kW level) delivery fibers to decrease the power density on an emitting facet surface. Without the endcap 802, the diameter of the emitting facet area is about 10-25 microns (fiber core) and the power density at the kW level of CW radiation may exceed the facet damaging level $~GW/cm^2$). Usually, the length of a coreless endcap is a few millimeters and the diameter is about 250-600 microns, which is approximately equal or larger than diameter of cladding. The addition of the endcap 802 to the movable distal end of the delivery fiber decreases substantially, 500-1000 times, the power density on a facet (from $GW/cm^2$ to a few $MW/cm^2$).

The fiber positioner 863 may be configured as described in U.S. Pat. No. 8,503,837, incorporated herein by reference. The fiber positioner 863 comprises a plurality of bending actuators and flexible beams (the view of FIG. 6 illustrates actuators 101, 301 and beams 313, 333; however, the fiber positioner 863 may comprise four bending actuators and four flexible beams according to an example). The fiber positioner 863 may further comprise a flexible tube 320. Typical 2D micro-lens positioners (for instance used in CD and DVD optical drives) provide relatively fast motion only in the Z-direction with very small (microns) range (voice coil or piezo-elements). Movement in other directions, (for instance radial in CD and DVD drives) is slow, despite the large range of motion (tens of mm), where the mechanical interaction of rotating screw with moving nut is used. It is challenging to make a compact 3D moving engine on the basis of this approach.

Figure 7:
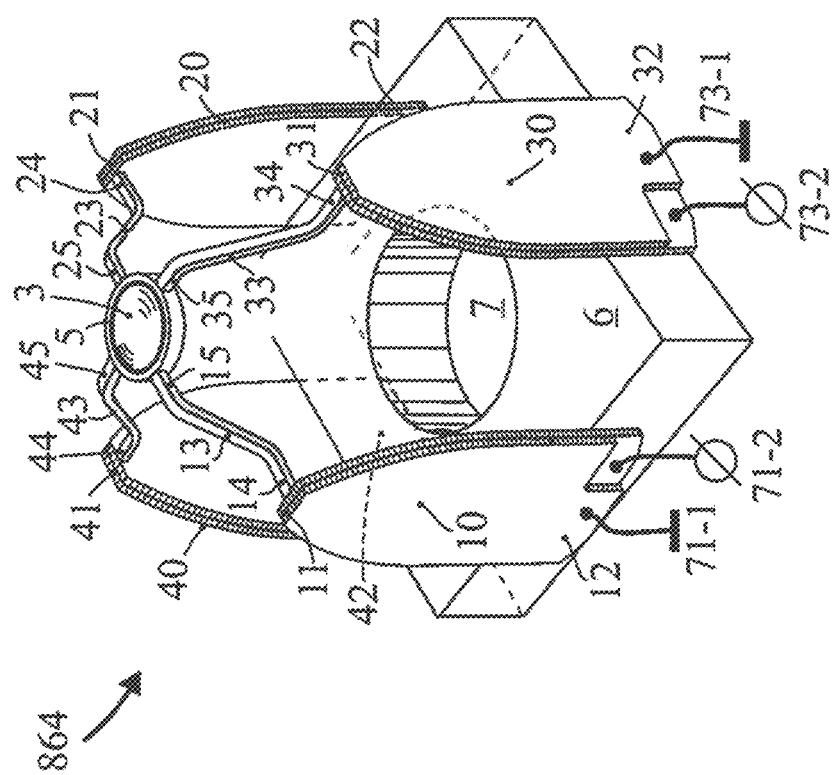
FIG. 7 illustrates a X-Y-Z lens positioner using bending bimorph actuators.

FIG. 7, with reference to FIGS. 2 through 6, illustrates an X-Y-Z lens positioner 864 using bending bimorph actuators. The lens positioner 864 comprises a plurality of flexible S-shaped beams 13, 23, 33, 43, connecting the collar 5 with tops 11, 21, 31, 41 of bending actuators 10, 20, 30, 40. The beams 13, 23, 33, 43 comprise inner ends 15, 25, 35, 45, and proximal ends 14, 24, 34, 44, respectively. Actuator bottoms 12, 22, 32, 42 are attached to the base 6. Laser beam from fiber is incident on lens 3 preferably on top of lens 3. A collimated beam passes though the opening (e.g., bore) 7 in the base 6. Voltages 71-1, 71-2 are applied to actuator 10 and voltages 73-1, 73-2 are applied to actuator 30. Other corresponding voltages are also applied to the actuators 20, 40, respectively.

In FIGS. 8 through 11, with reference to FIGS. 2 through 7, illustrate the operation of the transmitter 840 with control of the focus/defocus and azimuth/elevation of the output beam when the corresponding bending of the actuators 10, 20, 30, 40 of X-Y-Z lens positioner 864 are initialized with controlled voltages.

Figure 8:
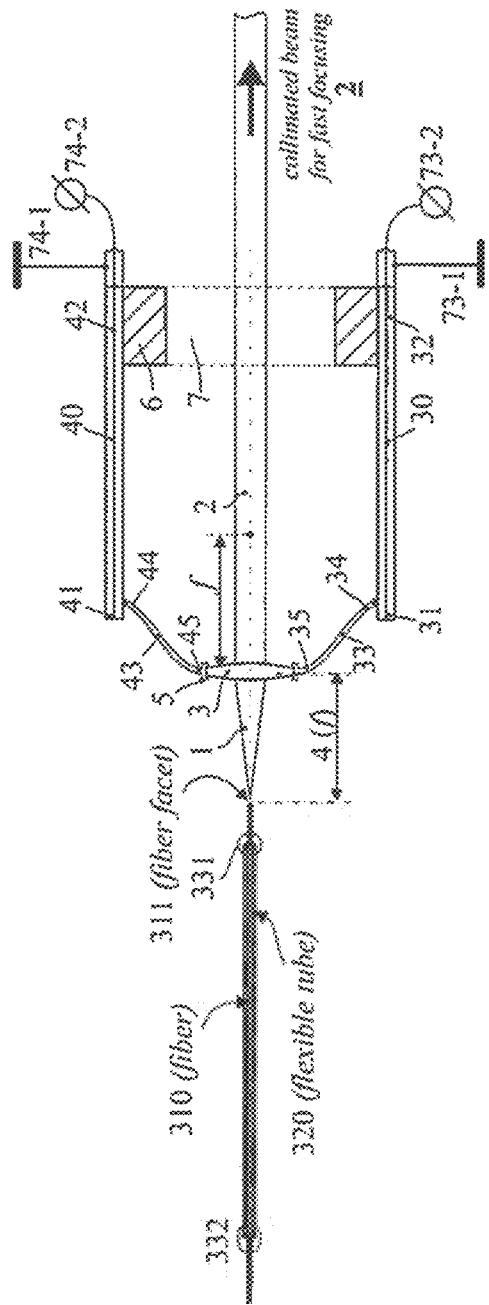
FIG. 8 illustrates an initial stage of a lens positioner.

FIG. 8, with reference to FIGS. 2 through 7, shows the initial stage of the lens positioner 864. Lens 3 is in position where the output beam is parallel (collimated). Emitting fiber tip 311 is in focus of lens 3, and a divergent beam 1 is input to lens 3. As shown in FIG. 8, voltages 73-1, 73-2 are applied to actuator 30, and voltages 74-1, 74-2 are applied to actuator 40. Other corresponding voltages are also applied to the actuators 10, 20, respectively. The focal length, f, of lens 3 is numerated as number 4 on FIG. 8. Drops of adhesive 331, 332 are applied to the distal and proximal ends of a flexible tube 320 to provide the gentle but stable, mechanical connection of the delivery fiber 310 with the flexible tube 320 during fast (kHz) motion of the fiber tip with endcap facet 311. One characteristic of the connection is an almost zero parasitic leakage of optical radiation from kW class delivery fiber, which allows one to avoid the overheating of the movable endcap 802 despite its extremely small weight; e.g., a few milligrams.

Figure 9:
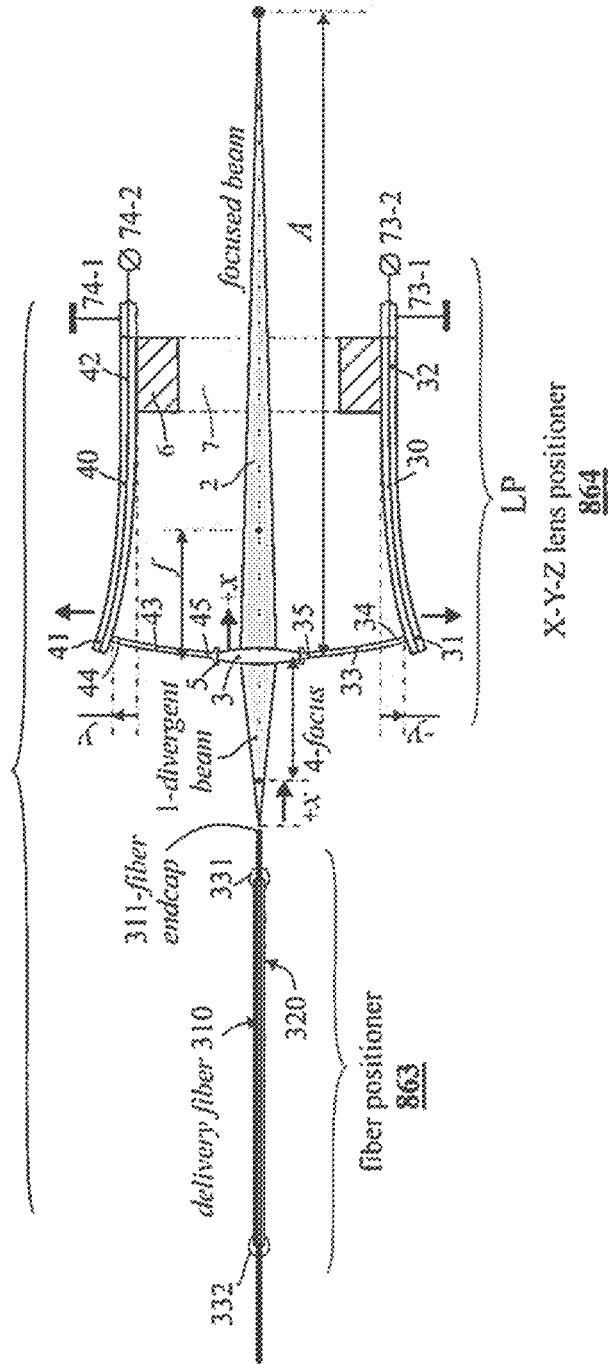
FIG. 9 illustrates a process of focusing a collimated beam when the actuators are bending outward.

FIG. 9, with reference to FIGS. 1 through 8, depicts focusing the collimated beam 2 when actuators 10, 20, 30, 40 are bending outward (in the view of FIG. 9 only actuators 30 and 40 are shown). The focus location A is controlled by micro-lens displacement x: $A=(ff+fx)/x=f(1+f/x)$, where f is focal length of micro-lens 3. S-shaped beams 13, 23, 33, 43 (in the view of FIG. 9 only beams 33 and 43 are shown) are deformed by outward displaced actuator tops 11, 21, 31, 41 (in the view of FIG. 9 only tops 31, 41 are shown) in such a manner that inner ends 15, 25, 35, 45 (in the view of FIG. 9 only inner ends 35, 45 are shown) of S-shaped beams 13, 23, 33, 43 together with collar 5 are moving to the right (in the orientation presented in FIG. 9) forcing the micro-lens 3 to move a distance x.

Figure 10:
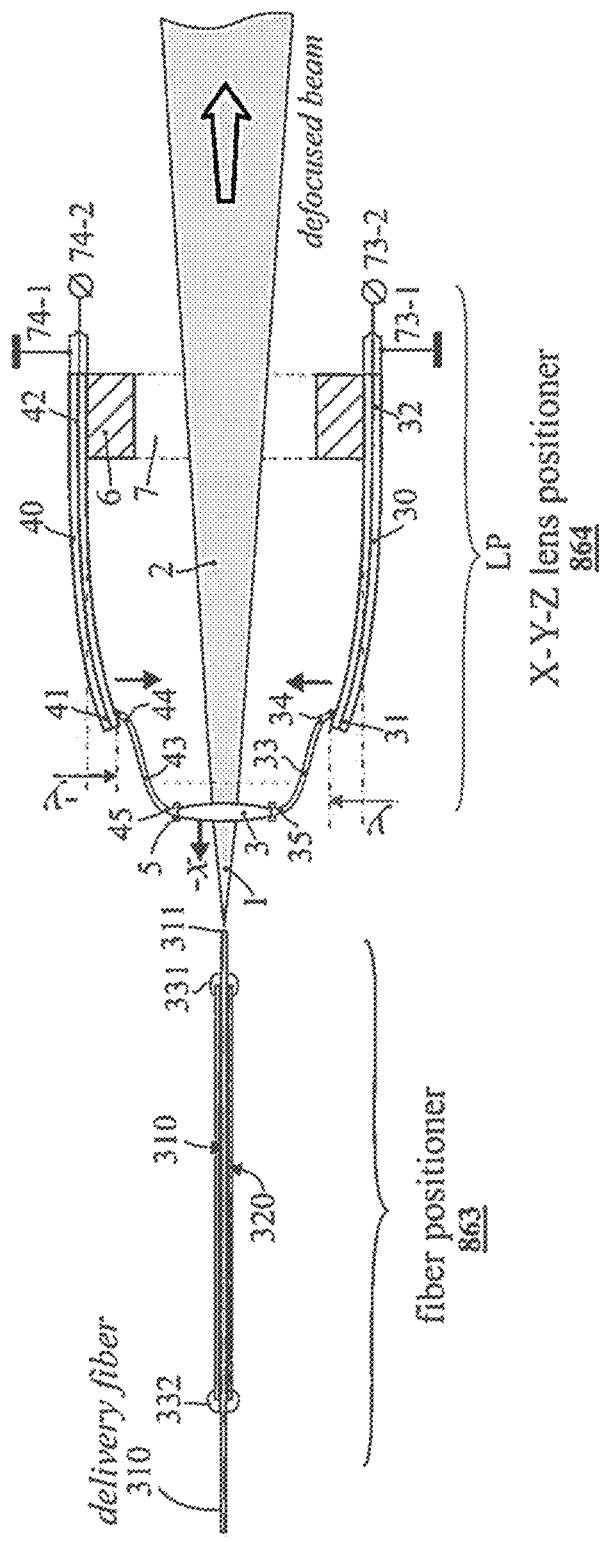
FIG. 10 illustrates a process of de-focusing a collimated beam when the actuators are bending inward.

FIG. 10, with reference to FIGS. 2 through 9, shows the de-focusing of the collimated beam 2 when actuators 10, 20, 30, 40 (in the view of FIG. 10 only actuators 30, are shown) are bending inward. The micro-lens 3 is moving to the left (in the orientation presented in FIG. 10). S-shaped beams 13, 23, 33, 43 (in the view of FIG. 10 only beams 33 and 43 are shown) are deformed by inward displaced actuator tops 11, 21, 31, 41 (in the view of FIG. 10 only tops 31 and 41 are shown) in such a manner that inner ends 15, 25, 35, 45 (in the view of FIG. 10 only inner ends 35 and 45 are shown) of S-shaped beams 13, 23, 33, 43 together with collar 5 are moving to the left forcing the micro-lens 3 to move a distance −x.

Figure 11:
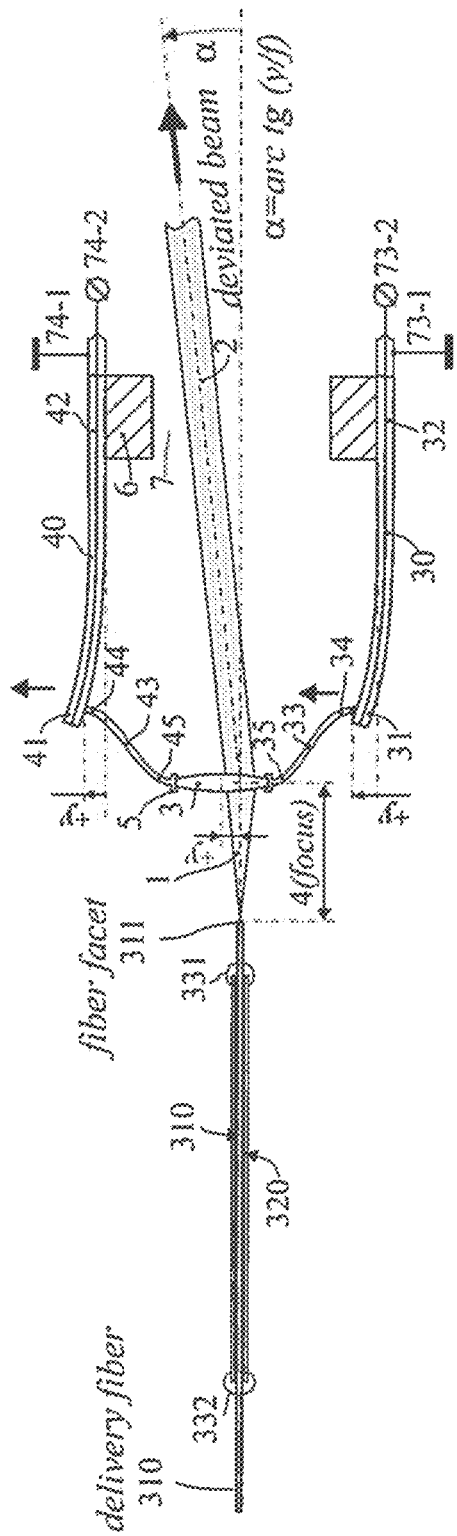
FIG. 11 illustrates the direction of the collimated beam when the actuators are bending in-phase to the top.

FIG. 11, with reference to FIGS. 2 through 10, shows the direction of a deviated collimated beam 2 when elevated if actuators 30, 40 are bending in-phase to the top. The micro-lens 3 also moves up (in the orientation presented in FIG. 11). S-shaped beams 33, 43 move up by actuator tops 31, 41 which are also moving up. Vertical displacement of micro-lens 3 to distance y induces the deviation (elevation) of the collimated beam 2 at angle $\alpha=\arctan(y/f)$, where f is a focal length of micro-lens 3. The S-shaped beams 13 and 23 (not visible in FIG. 11) are slightly perturbed, as it is shown in FIGS. 12A through 12C.

Figure 12C:
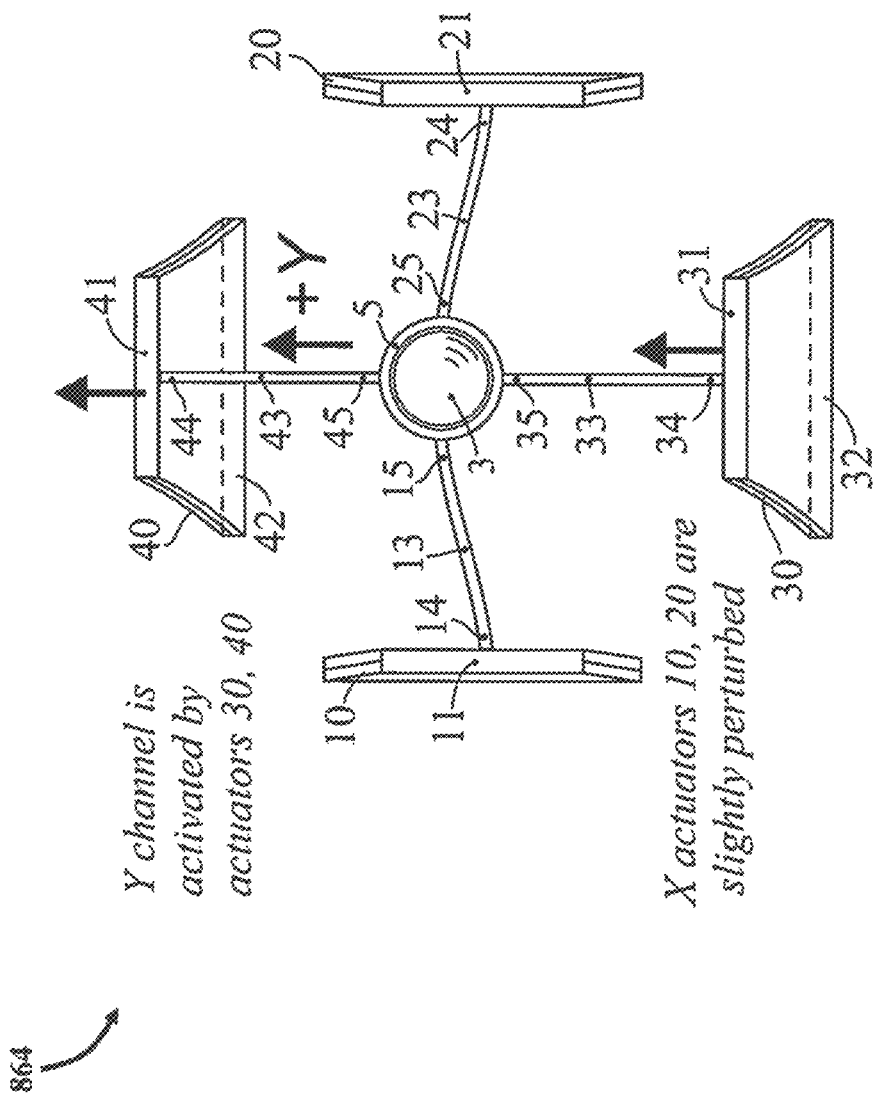
FIG. 12C illustrates a top view of a lens positioner when the actuators are bending up.

FIGS. 12A through 12C, with reference to FIGS. 2 through 11, illustrate a top view of the lens positioner 864 in three stages of displacement, respectively, of the actuators 10, 20, 30, 40. FIG. 12A shows the lens positioner 864 in an initial stage. FIG. 12B shows that actuators 10, 20 are bended to the right (in the top view) with displacement in the +x orientation of the micro-lens 3 to the right due to push-pull action of S-shaped beams 13, 23. S-shaped beams 33, 43 and actuators 30, 40 may be slightly perturbed. FIG. 12C shows that actuators 30, 40 are bended up with displacement in the +y orientation of the micro-lens 3 up due to push-pull action of S-shaped beams 33, 43. S-shaped beams 13, 23 and actuators 10, may be slightly perturbed.

The lens positioner 864 is configured to deviate the collimated beam 2 in both azimuth and elevation directions. If the fiber tip 311 in the fiber positioner 863 is synchronously displaced the same distance in the X and/or Y direction as X and/or Y directions of the micro-lens 3, the resulting movement of the collimated beam 2 is a parallel shift. Thus, the combination of the fiber positioner 863 and the lens positioner 864 provide the control of five degrees of freedom of the laser beam emitted by the fiber tip 311.

FIGS. 13 through 17 illustrate various ways that the laser beam 1 is controlled.

Focus:

FIG. 13, with reference to FIGS. 2 through 12C, shows focusing the laser beam 1 by means of displacement of the micro-lens 3 in the lens positioner 864 to the right. At corresponding voltages 71-1, 71-2, 72-1, 72-2, 73-1, 73-2, 74-1, 74-2 applied to the bimorph bending actuators 10, 20, 30, 40 the distal ends of actuators 11, 21, 31, 41 are bending outward pulling the proximal ends 14, 24, 34, 44 of S-shaped beams 13, 23, 33, 43. The distal ends 15, 25, 35, 45 of these S-shaped beams 13, 23, 33, 43 attached to the collar 5 force the collar 5 with the micro-lens 3 to move to the right (based on the orientation shown in FIG. 13). The fiber positioner 863 is shown in FIG. 13 comprising a collar 401 and flexible beams 430, 440. Voltages 235, 236, 245, 246 are not applied to the fiber positioner 863 and the fiber facet 311 in the initial position. A multi-functional base 100 of the fiber positioner 863 is provided where the proximal ends 212, 222, 232, and 242 of bending actuators 210, 220, 230, and 240, respectively, are firmly attached, for example with hard epoxy. A drop of hard adhesive 323 may be used to hold the flexible tube 320 firmly attached to the base 100. At this point, the tube 320 is capable to bend in unison with bending actuators 210, 220, 230, 240 due to push-pull action of flexible beams 410, 420, 430, 440 and adhesive 323 locates the "pivot" point for bending of tube 320. In FIG. 13 only actuators 230 and 240 are shown providing the displacement of the fiber endcap 311 in the plane of the view shown (±Y displacements).

Defocus:

FIG. 14, with reference to FIGS. 2 through 13, shows de-focusing the beam 1 by means of displacement of the micro-lens 3 to the left, in the lens positioner 864. At corresponding voltages 71-1, 71-2, 72-1, 72-2, 73-1, 73-2, 74-1, 74-2 applied to the bimorph bending actuators 10, 20, 30, 40 the distal ends of actuators 11, 21, 31, 41 are bending inward pushing the proximal ends 14, 24, 34, 44 of the S-shaped beams 13, 23, 33, 43. The distal ends 15, 25, 35, 45 of the S-shaped beams 13, 23, 33, 43 attached to the collar 5 force the collar 5 with the micro-lens 3 to move to the left (in the orientation shown in FIG. 14). Voltages 235, 236, 245, 246 are not applied to the fiber positioner 863 and the fiber facet 311 in the initial position.

Elevation-Azimuth

Figure 15:
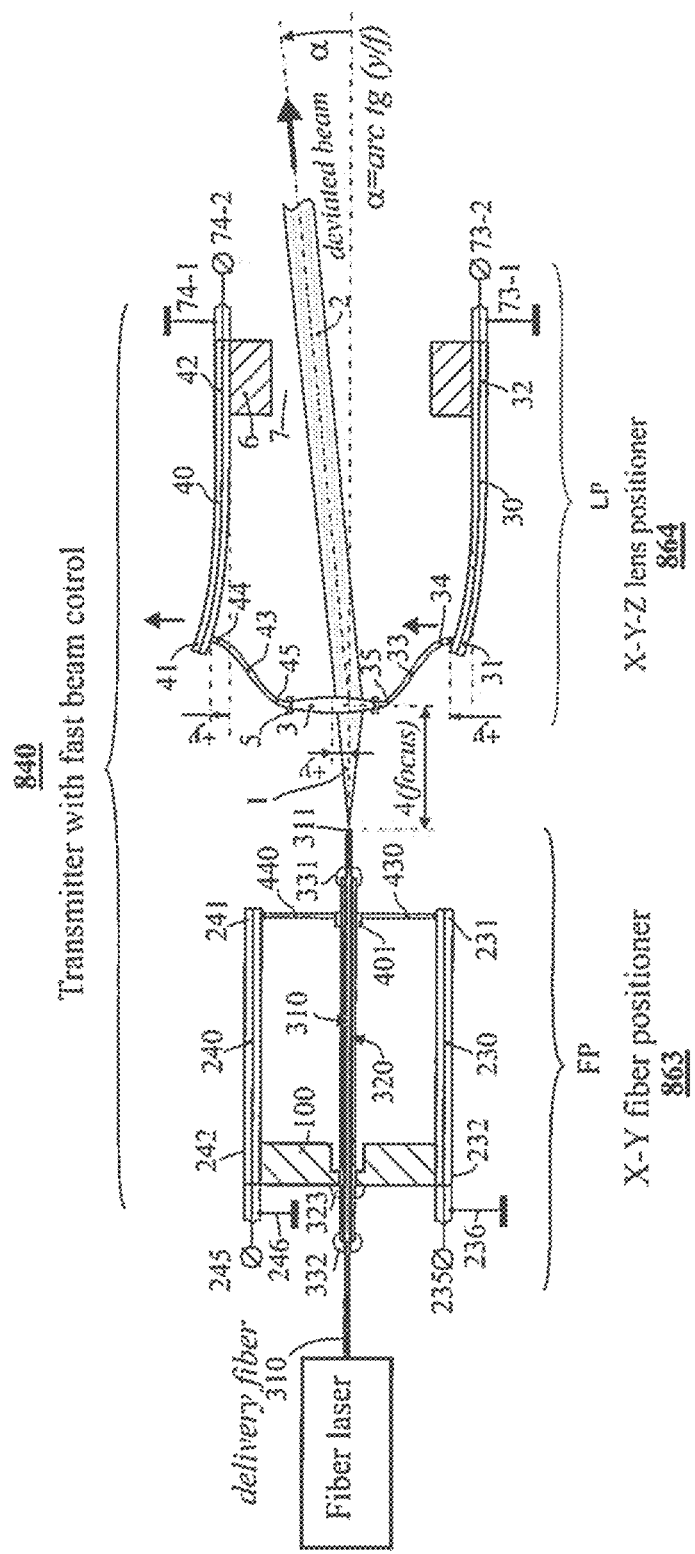
FIG. 15 illustrates an apparatus showing deviation of a collimated beam in vertical directions when a micro-lens is moving up.

FIG. 15, with reference to FIGS. 2 through 14, shows deviation of the collimated beam, 2, in vertical directions by means of micro-lens shift, +y. Elevation of the beam 2 is shown when micro-lens 3 is moving up. At corresponding voltages, 73-2, 74-2, applied to bimorph bending actuators 30, 40, the distal ends 31, 41 of actuators 30, 40 are moving to the top pushing the proximal end 34, and pulling the proximal end 44 of S-shaped beams 33, 43. The distal ends 35, 45 of the S-shaped beams 33, 43 attached to the collar 5 cause the collar 5 with the micro-lens 3 to move up. All of the actuators 10, 20, 30, 40 and S-shaped flexible beams 13, 23, 33, 43, and their deformations are shown in FIG. 7 and FIGS. 12A through 12C. Voltages 235, 236, 245, 246 are not applied to the fiber positioner 863 and the fiber facet 311 in the initial position. Voltages 71-2, 72-2 are not applied to the actuators 10, 20 (not shown in FIG. 15).

Figure 16:
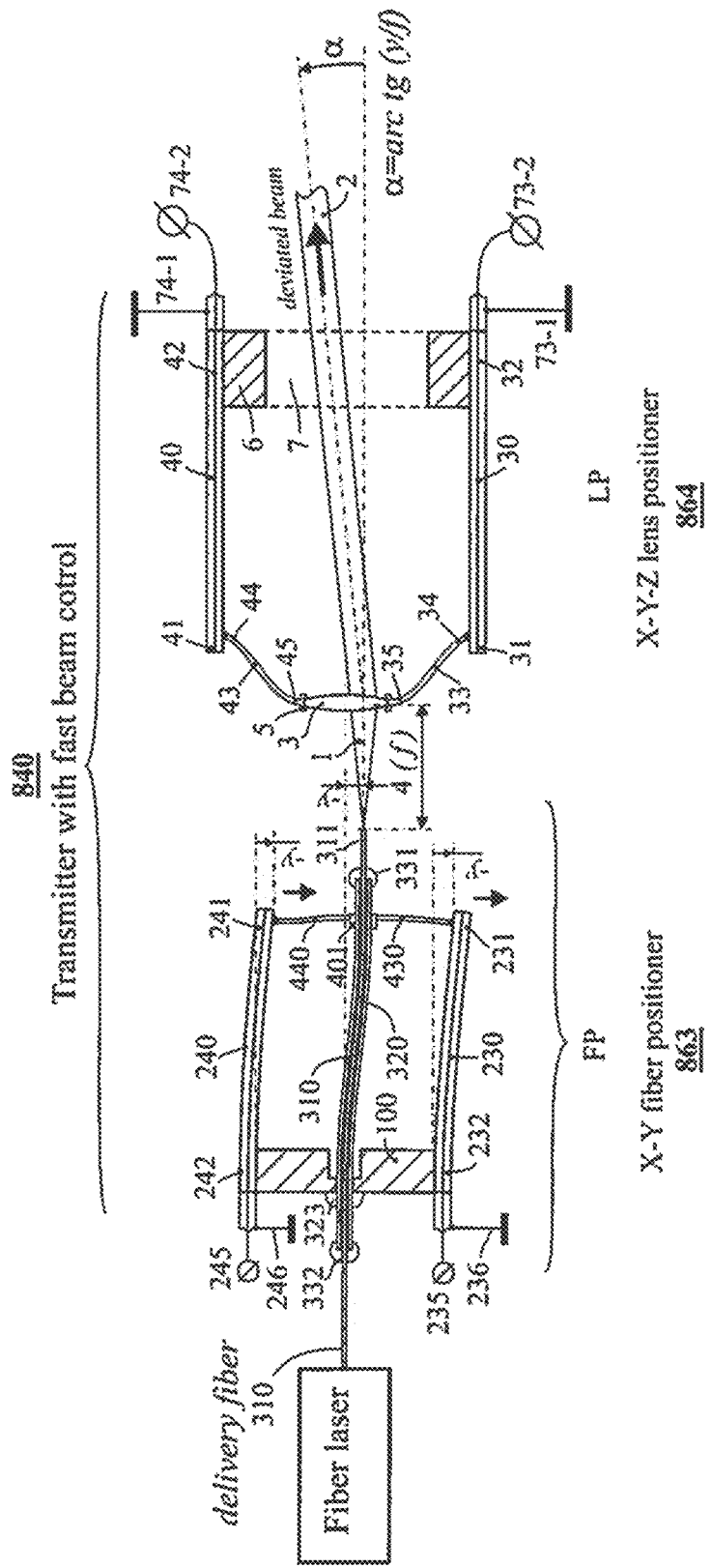
FIG. 16 illustrates an apparatus showing deviation of a collimated beam in vertical directions when a fiber endcap is moving down.

The same deviation of the collimated beam 2 in the plane of the page, elevation a, may be accomplished by means of a shift of the fiber endcap with facet 311 down, if distal ends 231, 241 of actuators 230, 240 of the fiber positioner 863 bend down causing the collar 401 to move down through the push-pull action of flexible beams 430, 440, thereby bending the distal end of the flexible tube 320 together with the embedded delivery fiber 310 relative to the pivot point 323, as indicated in FIG. 16, showing the elevation of the collimated beam 2 in vertical directions by means of a shift of the fiber endcap 311 in a −y direction.

The azimuthal deviations of collimated beam 2 may be activated with lens positioner 864 when corresponding voltages, 71-2, 72-2 are applied to actuators 10, 20 (not shown in FIG. 16). Distal ends 11, 21 (not shown in FIG. 16) of actuators 10, 20 bend toward or backward in a direction perpendicular to the page, pushing and pulling the proximal ends 14, 24 of the S-shaped flexible beams 13, 23 (not shown in FIG. 16) and causing them to move toward (or backward) from the plane of the page. Distal ends 15, 25 of flexible beams 13, 35 are pushing and pulling the collar 5 with micro-lens 3 toward (or backward) from the plane of the paper, ultimately deviating the beam 2 in azimuthal directions in the plane perpendicular to the page. All actuators 10, 20, 30, 40 and S-shaped flexible beams 13, 23, 33, 43 and their deformations are shown in FIGS. 7 and 12A through 12C.

Parallel Shifts

Figure 17:
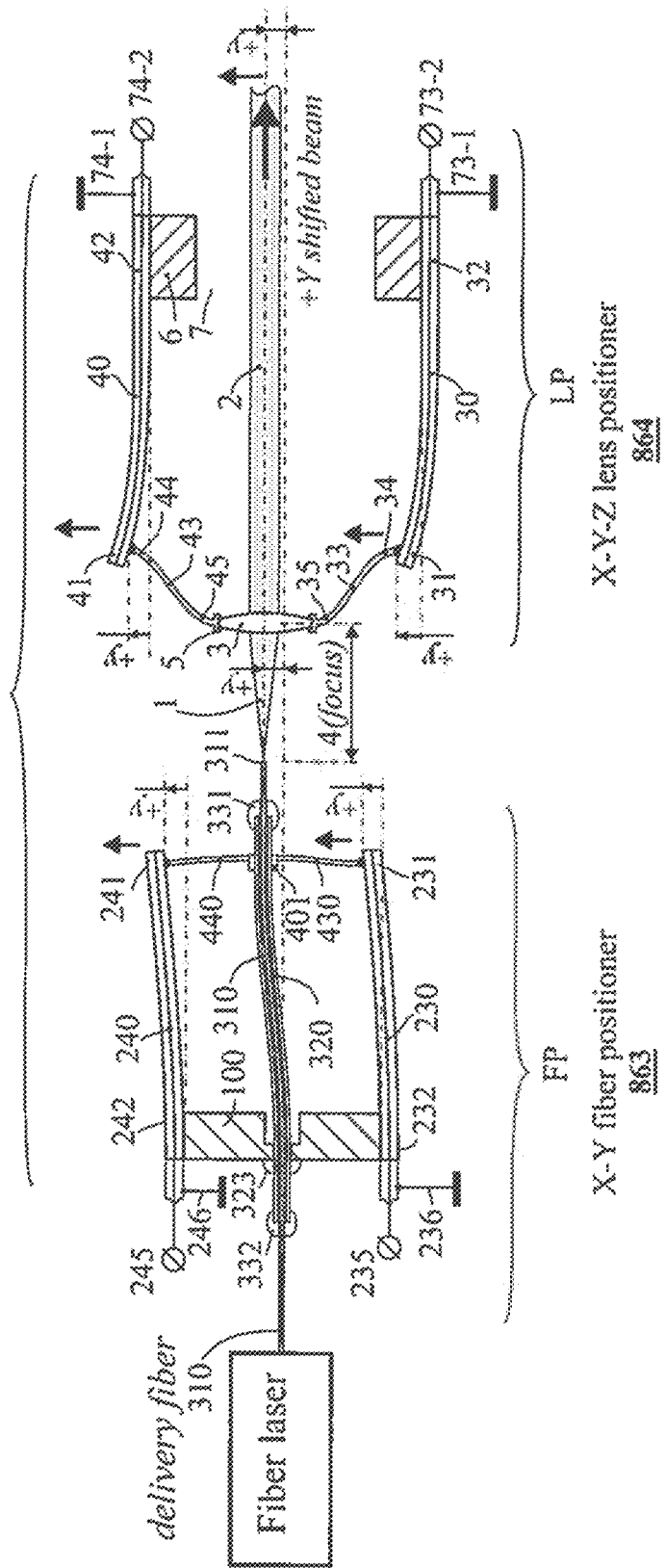
FIG. 17 illustrates parallel displacement of a collimated beam in vertical directions when a fiber facet and micro-lens are moving up.

FIG. 17, with reference to FIGS. 2 through 16, shows parallel displacement of collimated beam 2 in vertical directions. Fiber facet 311 and micro-lens 3 are moving up. In FIG. 17 the controlled Y-shift of the collimated beam 2 is shown. For this control, the application of voltages 235, 245 to bending actuators 30, 40 of fiber positioner 863 causes the shift of the fiber facet 311 to move up and the application of voltages 73-1, 74-1 to bending actuators 30, 40 of lens positioner 864 cause the collar 5 with the micro-lens 3 to move up also. At appropriate amplitude of voltages, the parallel shift +y may be activated.

Damping of Resonances in Lens Positioner

Figure 18:
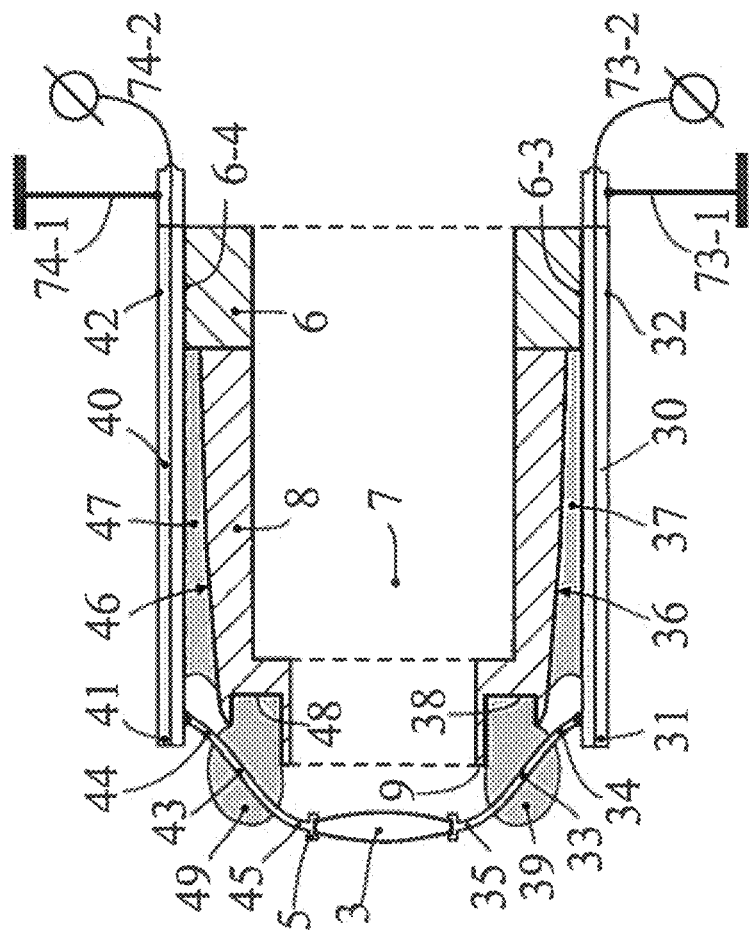
FIG. 18 illustrates the damping of bending actuators and S-shaped beams of a X-Y-Z converter.

The embodiments herein also provide for passive damping mechanisms for suppressing the resonances of both bending actuators and X-Y-Z (3D-cross) converter in the lens positioner 864. These mechanisms are shown in FIG. 18, with reference to FIGS. 2 through 17. Only actuators 30, 40, S-shaped beams 33, 43, and their damping mechanisms 37, 47 and 39, 49, respectively, are shown in FIG. 18 for illustration of the damping of vibrations in the plane of the page. Similar configurations exist for vibrating parts and damping mechanism for the plane perpendicular to the page (not shown in FIG. 18). The base 6 comprises areas 6-3, 6-4, which are the areas of the base 6 of the lens positioner 864 where the proximal ends 32, 42 of bending actuators 30, 40, respectively, are firmly attached by hard epoxy. The distal ends 31, 41 of actuators 30, 40, respectively, are configured to bend around these areas 6-3, 6-4, thereby these areas 6-3, 6-4 may be considered as pivot points for the actuators 30, 40.

Damping of Actuators

A prism 8 is attached to the base 6, as shown in FIG. 18. The prism 8 has side profiled surfaces 36, 46 forming gaps with actuators 10, 20, 30, 40. Damping material 37, 47 is filled into these gaps. The damping material 37, 47 may be introduced through vertical channels connecting input holes on the top 9 of the prism 8 with the bottom of the gaps as described in U.S. Pat. No. 8,503,837. The damping material, which may comprise a two-component silicone mixture, for example, is installed in a fluidic stage followed by a polymerization after complete filling of the gaps.

Damping of X-Y-Z Converter

The X-Y-Z converter (3D cross with S-shaped flexible beams 13, 23, 33, 43) is damped through local damping of the flexible beams 13, 23, 33, 43 with similar damping material 39, 49 filled in cavities 38, 48. The S-shaped beams 13, 23, 33, 43 pass through the cavities from the tops 31, 41 of the actuators 30, 40 to the collar 5, which holds the micro-lens 3. Similar mechanisms exist for actuators 10, 20 as well, but are not shown in the view of FIG. 18. The cavities 38, 48 are located on the top 9 of prism 8, and may be filled from the top surface through the appropriately designed channels. The shape of the S-shaped beams 13, 23, 33, 43, and the cavities may be fitted for optimum efficiency of damping of the beams 13, 23, 33, 43. For example, FIG. 18 further illustrates this concept, where the S-shape of each beam 13, 23, 33, 43 is adjusted to the structure of the cavities and channels supplying the damping material 39, 49. The damping material 39, 49 may be two-component silicone mixture, in an example, which is installed into cavities 38, 48 in a fluidic stage. After polymerization, a visco-elastic material with a pre-determined hardness and viscosity is formed.

Figure 19:
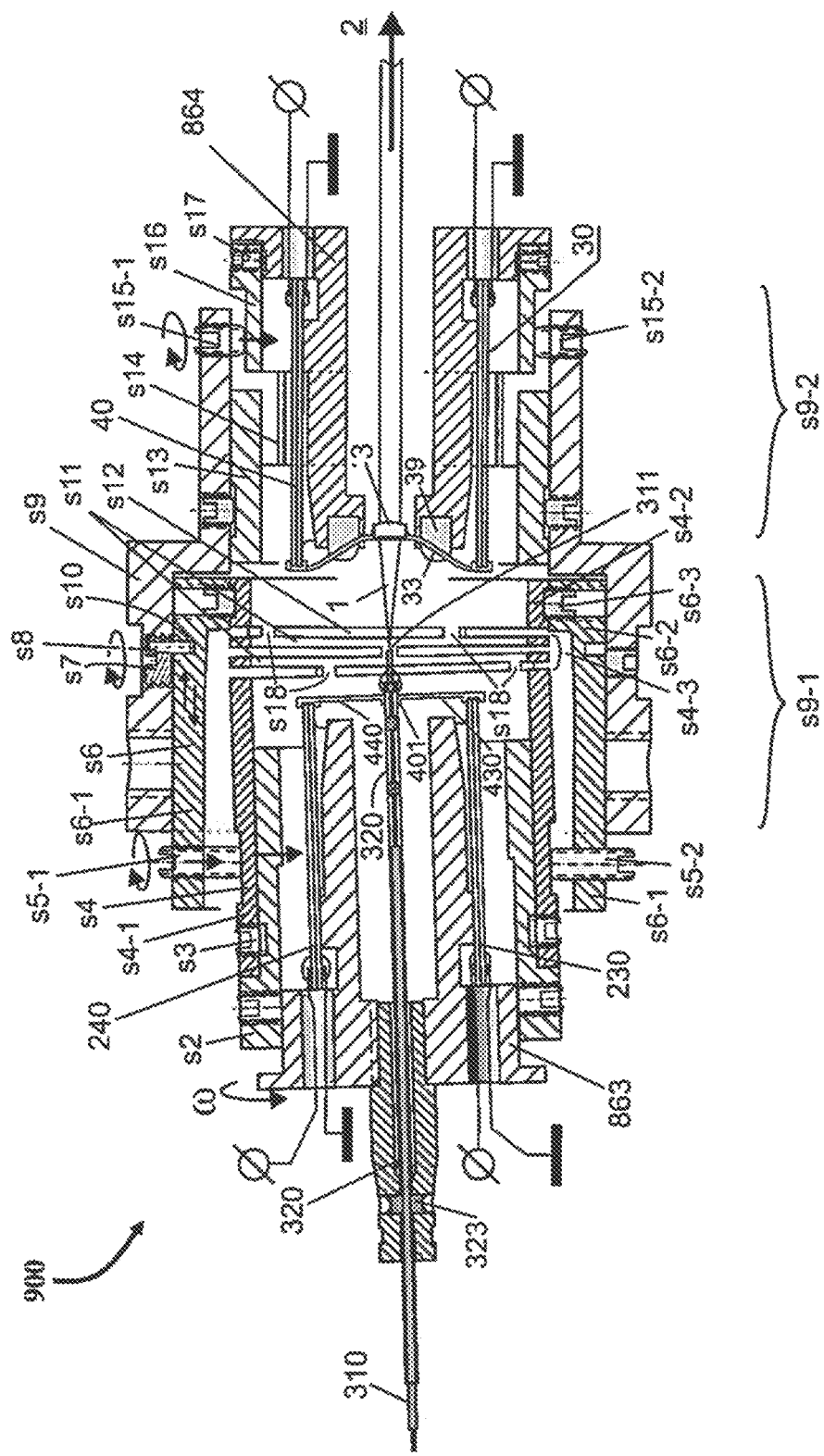
FIG. 19 illustrates a cross-sectional view of a compact transmitter.

The embodiments herein provide a compact transmitter 900 comprising the fiber positioner 863 and lens positioner 864 with mechanisms for initial alignment of the laser beam 1. An example transmitter 900 is shown in FIG. 19, with reference to FIGS. 2 through 18, and comprises a mount s9 with a proximal region s9-1 and a distal region s9-2. Mount s9 provides for five degrees of freedom for initial alignment of the beam emitted with the fiber endcap with facet 311. 2D fiber positioner 863 and 3D micro-lens positioner 864 are combined in the mount s9 using retaining mechanism such as holder s2, flexure s4, barrel s6, and screws s5-1 and s5-2 and s7. There may be only one screw s7 with eccentric rod s8. The holder s2, flexure s4, and screws s5-1 and s5-2 and s7 allow one to accomplish the initial precision alignment of the emitted divergent beam 1 in a pre-determined tip/tilt direction, with optimum alignment of the optical axis (centroid) of beam with center of lens 3 and with pre-determined focusing of the fiber laser beam 1.

An assembly comprising the holder s2, flexure s4, and barrel s6 with the fiber positioner 863 is located in the proximal region s9-1 of the mount s9. The fiber positioner 863 is located in holder s2, which is configured to rotate in the proximal part of flexure s4. Flexure s4 comprises of three regions: proximal end s4-1 where holder s2 is accommodated, distal end s4-2 that is inserted into the barrel s6, and flexible area s4-3 formed with interchanging flexible rings s11, and slits s12, said rings and slits are connected to each other and to parts s4-1 and s4-2 with thumbs s18 remaining after cut the slits s12 in flexible area s4-3. Screws s3 in the proximal end s4-1 of flexure s4 may be tighten when the optimum angle of rotation ω of the fiber positioner holder s2 is selected, for instance with an optimal polarization plane emitted by the fiber endcap with facet 311.

Distal end s4-2 of flexure s4 is inserted into distal end s6-2 of Z-movable barrel s6 and may be locked with distal end s6-2 of barrel s6 with screws s6-3 located on distal end s6-2 of barrel s6. Owing to flexibility of area s4-3, the proximal end s4-1 of flexure s4 is configured to bend relative to the point where the fiber endcap with facet 311 is located. For this bending, four screws s5 (s5-1, s5-2, . . . ) located on proximal end s6-1 of barrel s6 push the proximal end s4-1 of flexure s4 with holder s2 and with fiber positioner 863 in such a manner that fiber endcap with facet 311 remains in the same point without X-Y-Z displacements. However, the direction of the collimated beam 2 may be aligned along an axis of symmetry of the lens positioner 864 including the co-alignment of this beam 2 with the optical axis of the micro-lens 3. Four screws s5 may bend the proximal end s4-1 of flexure s4 in the azimuth and elevation directions by means of rotating in the same direction of two opposite screws, e.g., screws s5-1 and s5-2 deviating the part s4-1 down in elevation in FIG. 19. The goal of inclination of fiber positioner 863 relative to the facet 311 is to align the centroid of the emitted beam 1 with the center of lens 3. Such alignment is necessary due to that the surface of endcap facet 311 of high power delivery fiber can be not perpendicular to the axis of fiber but there is some inclination with angle 3.5° or more. This angled facet surface is deviating the facet 311 internal back reflected radiation from fiber core, thereby significantly reducing the probability of damaging the low-power stages of a fiber amplifier. Hence, the central axis of the emitted beam 1 will be deviated from the fiber axis on a relatively large angle of 2° or more. The selected optimal angle of bending may be locked with the same screws if opposite screws rotate in opposite directions.

The barrel s6 containing the assembly of flexure s4, holder s2, and fiber positioner 863, is installed into mount s9, and is configured to move along a symmetry axis of the mount s9. The precision alignment of lens positioner 864 with micro-lens 3 along the optical axis may be accomplished by rotating the screw s7 in mount s9. The eccentrically located stiff rod s8 cooperates with slot s10, engraved on a circumference of barrel s6, converting the rotation of screw s7 into longitudinal displacement of barrel s6 relative to the mount s9, and ultimately changing the distance between the fiber endcap facet 311 and the micro-lens 3.

Figure 20:
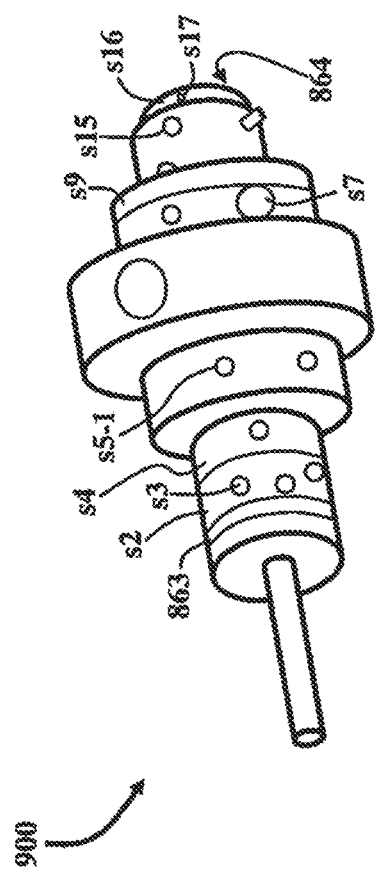
FIG. 20 illustrates a perspective view of the compact transmitter of FIG. 21.

Another assembly holding the lens positioner 864 is installed in distal region s9-2 of the mount s9. This assembly includes components s13, and s16 connected with flexible rods s14. The lens positioner 864 is installed into component s16. Four screws s15, two screws for X displacement and two screws for Y-displacement, may induce the parallel shifts, X and Y, of holder s16, relative to part s13, owing to the bending of four flexible rods, s14 (only two screws s15, for Y-control, and two rods s14 are visible in the view of FIG. 19). During these shifts the lens positioner 864 shifts ultimately providing the shifts of micro-lens 3 in the X and Y directions by means of screws s15 in distal end s9-2 of mount s9. For further optimization of lens alignment, the lens positioner 864 may be rotated inside of holder s16 around the axis of symmetry of holder s16, followed by tightening of the screws s17. Some parts and controlling screws of transmitter 900 are shown in FIG. 20.

Figure 21A:
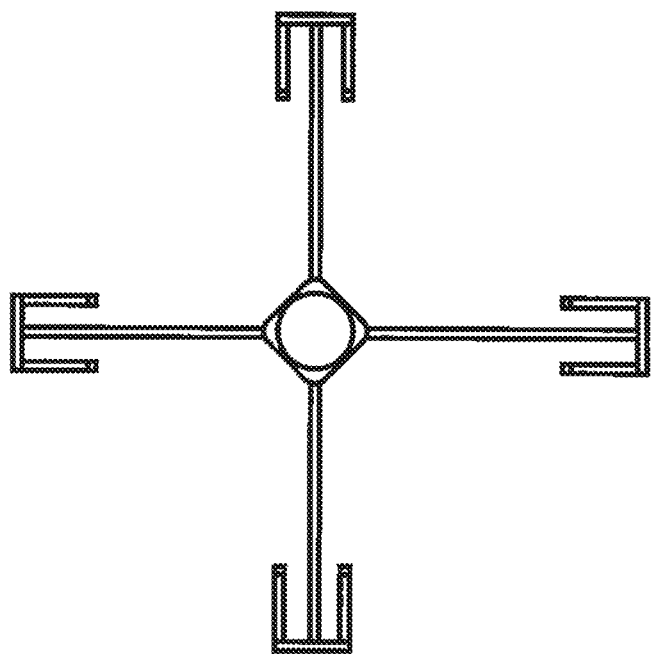
FIG. 21A illustrates a X-Y distributor for a lens positioner.
Figure 22:
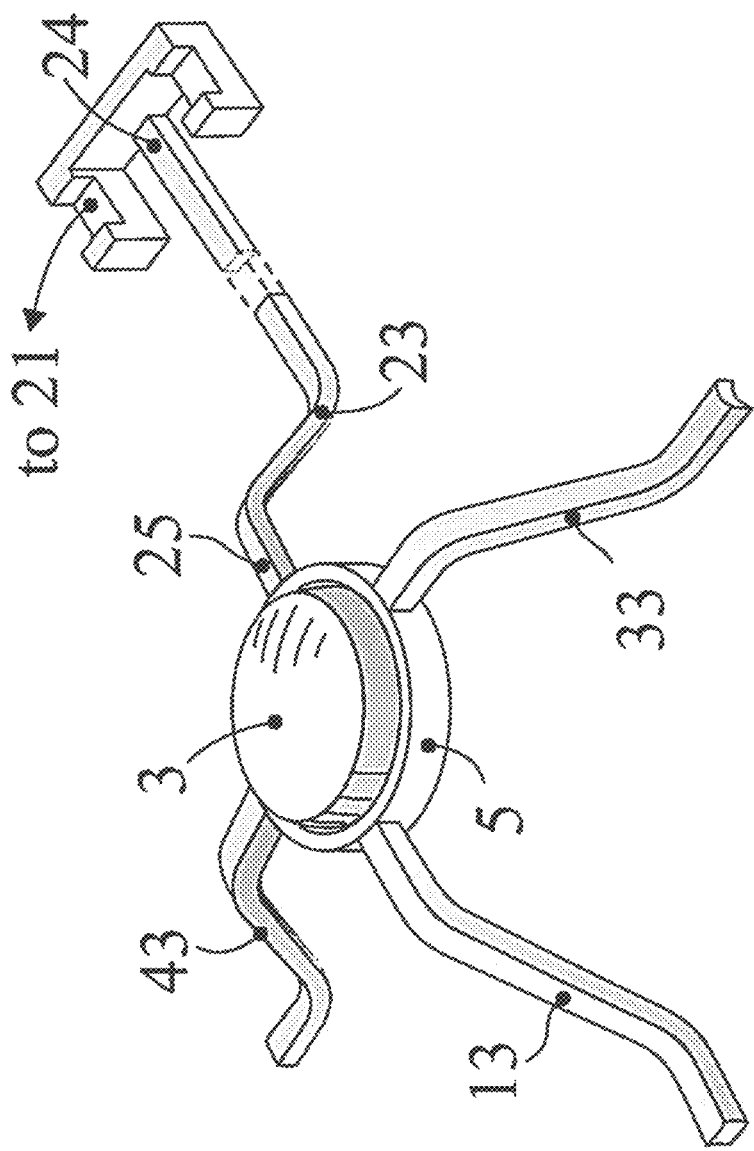
FIG. 22 illustrates a collar with a micro-lens.
Figure 23:
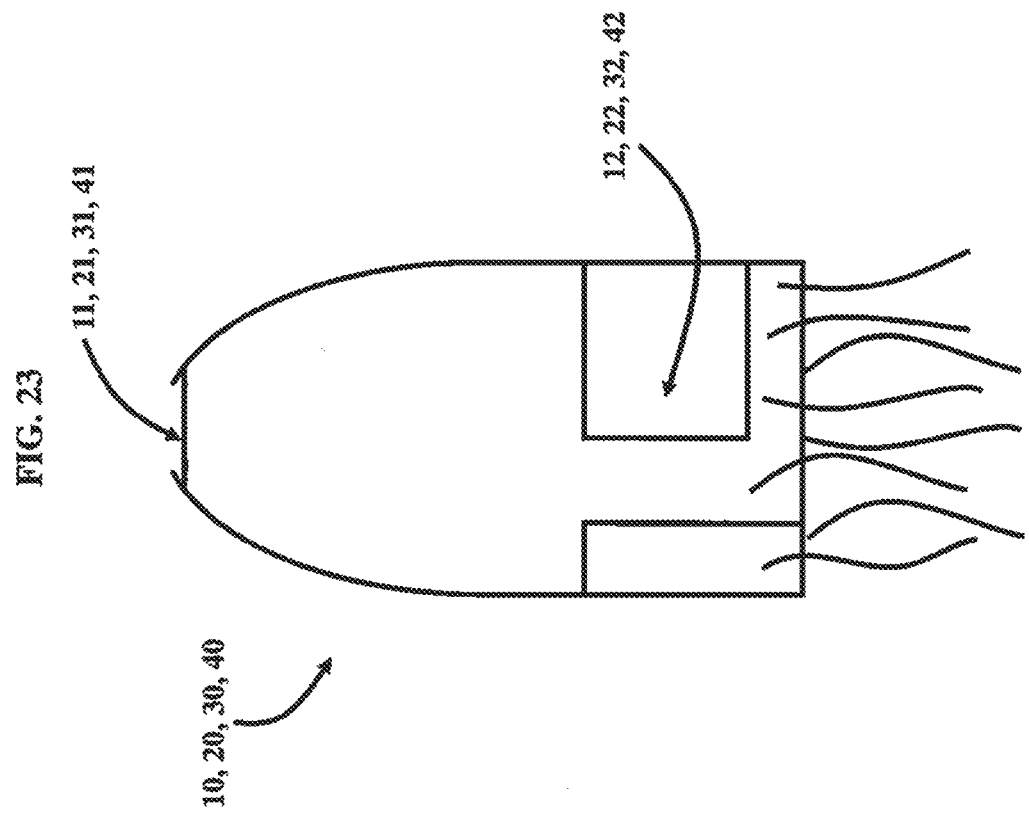
FIG. 23 illustrates a bending piezoelectric actuator.

FIG. 21A, with reference to FIGS. 2 through 20, illustrates a X-Y distributor 950 for a 2D lens positioner 864. FIG. 21B, with reference to FIGS. 2 through 20, illustrates an example of a X-Y-Z distributor 960 for a 3D lens positioner 864. In an example, the thickness of the flexible beams is approximately 300 μm. FIG. 22, with reference to FIGS. 2 through 21B, illustrates an example of a collar 5 with a micro-lens 3, which may be used in accordance with the embodiments described above. In an example, the diameter of the micro-lens 3 is approximately 2.5 mm. FIG. 23, with reference to FIGS. 2 through 22, illustrates an example of a bending piezoelectric actuator 10, 20, 30, 40.

Figure 24:
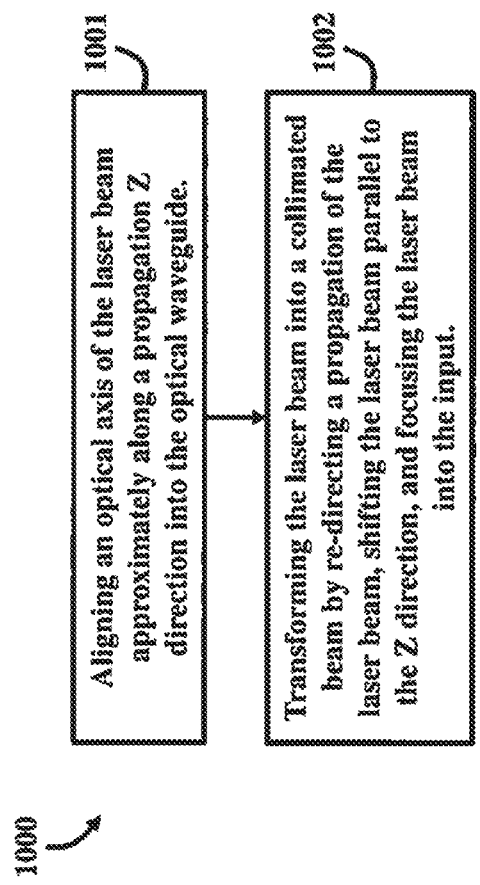
FIG. 24 is a flow diagram illustrating a method.

FIG. 24, with reference to FIGS. 2 through 23, is a flow diagram illustrating a method 1000 of delivery of a divergent laser beam emitted with a free-space laser fiber facet, the beam having an optical power, into an optical waveguide, the method comprising aligning (1001) an optical axis of the laser beam approximately along a propagation Z direction into the optical waveguide, wherein the fiber facet is located in a first plane perpendicular to the Z direction, wherein the waveguide comprises an input, direction, and a X-Y position of the input in a second plane, and wherein the waveguide comprises fluctuations in a X-Y-Z position of the input and fluctuations in direction; and transforming (1002) the laser beam into a collimated beam by re-directing a propagation of the laser beam, shifting the laser beam parallel to the Z direction, and focusing the laser beam into the input, wherein a speed of transformation of the laser beam is greater than an instant speed of the fluctuations, wherein a maximum optical power is delivered into the waveguide.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An apparatus for delivery of a divergent laser beam emitted with a free-space laser fiber facet into a waveguide with a fluctuating position of input, the apparatus comprising:

a fiber positioner comprising a wide frequency bandwidth of first X-Y displacements of the fiber facet in a first plane, wherein the first X-Y displacements comprise a first motion;

a micro-lens sampling and transforming the laser beam into a collimated beam, wherein the micro-lens comprises a focus length off, wherein the micro-lens is located in a third plane perpendicular to a propagation direction along a Z axis, wherein the third plane is located in between the first plane and a second plane approximately at a distance f from the fiber facet, wherein the micro-lens comprises an optical axis approximately coinciding with an axis of the laser beam, wherein the micro-lens is configured to be moved with a wide frequency bandwidth of second X-Y displacements in the third plane, and of a Z—displacement along the Z axis, wherein the second X-Y displacements comprise a second motion, and wherein a displacement along the Z axis comprises a third motion;

a plurality of bending actuators to create the first, second, and third motions;

an optical waveguide approximately along the Z axis;

a plurality of optical elements to intercept a fraction of intensity of a delivered laser beam into the waveguide or the fraction of intensity escaped from the waveguide;

an opto-electronic mechanism to convert the intensity to an electronic signal, proportional to a power of the delivered beam focused into the optical waveguide or escaped from the waveguide; and a feedback processor to provide the electronic signal to the plurality of bending actuators to maximize a focusing of a power of the laser beam into the optical waveguide or to minimize a power of an escaped beam fraction leaving the optical waveguide.

2. The apparatus of claim 1, wherein the optical waveguide comprises an air channel having a larger refractive index along a central axis than in periphery areas of the air channel.

3. The apparatus of claim 2, wherein the periphery areas comprise three or more substantially circularly arranged sub-channels comprising an average steady-state temperature higher than areas near the central axis of the air channel.

4. The apparatus of claim 3, wherein the sub-channels are formed with a filamentation process through a sequence of energy dissipation by delivering energy with ultra-short high-power laser pulses with a repetition rate of 1 kHz or more, and wherein a higher steady-state temperature exists in the sub-channels relative to a temperate in the central axis of the air channel.

5. The apparatus of claim 1, comprising a X-Y-Z lens positioner to provide the second and third motions of the micro-lens.

6. The apparatus of claim 5, wherein the lens positioner comprises:
- a plurality of bending actuators;
- a base comprising a plurality of side surfaces attached to the plurality of bending actuators; and
- a prism comprising a distal surface, a proximal surface, and a plurality of side surfaces, wherein the proximal surface is attached to the base, and wherein the distal surface accommodates a X-Y-Z micro-lens converter and viscous-elastic material damping the converter.

7. The apparatus of claim 6, wherein the plurality of bending actuators comprises a plurality of distal ends and proximal ends, wherein the plurality of proximal ends is attached to the plurality of side surfaces of the base, and side surfaces of the prism form a profiled gap with the plurality of bending actuators.

8. The apparatus of claim 7, wherein the micro-lens X-Y-Z converter is aligned with the base, wherein the X-Y-Z converter comprises a collar comprising the micro-lens and a plurality of flexible beams, and wherein the plurality of flexible beams comprises:
- a plurality of inward ends attached to the collar; and
- a plurality of outward ends attached to a plurality of distal ends of the bending actuators wherein the plurality of flexible beams comprises inflexions in planes along the Z axis.

9. The apparatus of claim 8, comprising viscous-elastic damping material to provide a suppression of resonance vibrations of the bending actuators and of the plurality of flexible beams of the X-Y-Z converter.

10. The apparatus of claim 8, wherein the plurality of bending actuators is configured to provide the second and third motions of the micro-lens using combinations of electrical voltages applied to selected ones of the plurality of bending actuators.

11. The apparatus of claim 8, wherein the second motion of the micro-lens occurs in a X direction by applying electrical voltages to a first pair of opposite bending actuators, wherein the second motion of the micro-lens occurs in a Y direction by applying electrical voltages to a second pair of opposite bending actuators, and wherein the third motion of the micro-lens occurs in a Z direction by applying electrical voltages to all of the plurality of bending actuators.

12. The apparatus of claim 7, wherein the base and the prism comprise a bore for transmitting the collimated beam coming through the micro-lens.

13. The apparatus of claim 8, wherein the distal ends of the plurality of bending actuators along with the micro-lens X-Y-Z converter are directed to the fiber facet.

14. The apparatus of claim 1, comprising a transmitter for the collimated beam emitted from the fiber facet, wherein the transmitter is configured for focusing into the optical waveguide.

15. The apparatus of claim 5, comprising an assembly containing a coaxial arrangement of the fiber positioner and the lens positioner in holding tubes.

16. The apparatus of claim 15, wherein the holding tubes comprise flexible areas and a controlling mechanism and provide mutual alignment of the fiber facet and micro-lens with six decoupled degrees of freedom, and wherein the controlling mechanism comprise screws and screw-eccentric assemblies.

* * * * *